United States Patent [19]

Means et al.

[11] Patent Number: 5,471,627

[45] Date of Patent: * Nov. 28, 1995

[54] SYSTOLIC ARRAY IMAGE PROCESSING SYSTEM AND METHOD

[75] Inventors: Robert W. Means, Rancho Santa Fe; Horace J. Sklar, Escondido, both of Calif.

[73] Assignee: HNC, Inc., San Diego, Calif.

[*] Notice: The portion of the term of this patent subsequent to Aug. 11, 2009, has been disclaimed.

[21] Appl. No.: 889,620

[22] Filed: May 26, 1992

Related U.S. Application Data

[63] Continuation-in-part of Ser. No. 419,040, Oct. 10, 1989, Pat. No. 5,138,695.

[51] Int. Cl.$^6$ ..................................... G06K 9/64
[52] U.S. Cl. ..................... 395/800; 395/27; 382/279; 364/728.01; 364/754; 364/724.12; 364/DIG. 1; 364/DIG. 2
[58] Field of Search ................ 364/728.01, 754, 364/724.12, DIG. 1, DIG. 2; 395/800, 27; 382/42

[56] References Cited

U.S. PATENT DOCUMENTS

| | | | |
|---|---|---|---|
| 4,546,445 | 10/1985 | Haugen | 364/728 |
| 4,559,606 | 12/1985 | Jezo et al. | 364/728 |
| 4,737,921 | 4/1988 | Goldwasser et al. | 364/518 |
| 4,752,897 | 6/1988 | Zoeller et al. | 364/550 |
| 4,758,999 | 7/1988 | Marwood et al. | 364/516 |
| 4,769,779 | 9/1988 | Chang et al. | 364/754 |
| 4,807,183 | 2/1989 | Kung et al. | 364/900 |
| 4,833,635 | 5/1989 | McCanny et al. | 364/728.01 |
| 4,868,828 | 9/1989 | Shao et al. | 371/5.1 |
| 4,885,715 | 12/1989 | McCanny et al. | 364/728.01 |
| 4,893,255 | 1/1990 | Tomlinson, Jr. | 364/513 |
| 4,937,774 | 6/1990 | Malinowski | 364/728.01 |
| 4,967,340 | 10/1990 | Dawes | 364/DIG. 1 |
| 5,138,695 | 8/1992 | Means et al. | 395/27 |
| 5,173,947 | 12/1992 | Chande et al. | 382/41 |
| 5,179,714 | 1/1993 | Graybill. | |

FOREIGN PATENT DOCUMENTS 2180968  4/1987  United Kingdom.

OTHER PUBLICATIONS

Kim et al., "On the Design of Fault–Tolerant Two–Dimensional Systolic Arrays for Yield Enhancement", IEEE, Apr. 1989, pp. 515–525.

Kung, "VLSI Array Processors: Designs and Applications", IEEE, 1988, pp. 313–320.

Aboulnasr et al., "Real–Time Systolic Array Processor for 2-D Spatial Filtering", IEEE, Apr. 1988, pp. 451–455.

Provence, J. D. and Gupta, S. C., "Systolic Arrays for Viterbi Processing in Communication Systems with a Time–Dispersive Channel," IEEE Transactions on Communications, vol. 36, No. 10, pp. 1148–1156, Oct. 1988.

Kim, J. H. and Reddy, S. M., "On the Design of Fault–Tolerant Two–Dimensional Systolic Arrays for Yield Enhancement", IEEE Transactions on Computers, v. 38, No. 4, pp. 515–525, Apr. 1989.

Primary Examiner—Alyssa H. Bowler
Assistant Examiner—Walter D. Davis, Jr.
Attorney, Agent, or Firm—A. C. Smith; Judson D. Cary

[57] ABSTRACT

A systolic array of processing elements is connected to receive weight inputs and multiplexed data inputs for operation in two dimension convolution mode, or fully-connected neural network mode, or in cooperative, competitive neural network mode. Feature vector or two-dimensional image data is retrieved from external data memory and is transformed via input look-up table to input data for the systolic array. The convoluted image or outputs from the systolic array are scaled and transformed via output look-up table for storage in the external data memory. The architecture of the system allows it to calculate convolutions of any size within the same physical systolic array, merely by adjusting the programs that control the data flow.

15 Claims, 38 Drawing Sheets

OTHER PUBLICATIONS

S. Y. Kung et al., "Parallel Architectures for Artificial Neural Nets", Princeton University, Dept. of Elec. Engineering, pp. II–165–II–172.

H. C. Fu et al., "A Universal Digital VLSI Design for Neural Networks", Dept. of Elec. Engineering, Princeton University, pp. 1–8.

Y. Fujimoto et al., "An Enhanced Parallel Toroidal Lattice Architecture for Large Scale Neural Networks", IJCNN 89 International Joint Conference on Neural Networks, Washington, D.C., Jun. 18–22, 1989.

R. Hecht–Nielsen, "Applications on Counterpropagation Networks", Neural Networks, vol. 1, pp. 131–139, 1988.

C. A. Mead et al., "A Silicon Model of Early Visual Processing", Neural Networks, vol. 1, pp. 91–97, 1988.

S. Grossberg et al., "Neural Dynamics of Perceptual Grouping: Textures, Boundaries, and Emergent Segmentations", Perception & Psychophysics 1985 38(2) pp. 141–171.

M. A. Cohen et al., "Masking Fields, A Massively Parallel Neural Architecture for Learning, Recognizing, and Predicting . . . " Center for Adaptive Systems, Boston University, Mar. 1986, pp. 1–44.

*FIGURE 5B*

IMAGE PIXEL ARRAY p(1,1) p(1,2) p(1,3) p(1,4) p(1,5) . . .
p(2,1) p(2,2) p(2,3) p(2,4) p(2,5) . . .
p(3,1) p(3,2) p(3,3) p(3,4) p(3,5) . . .
p(4,1) p(4,2) p(4,3) p(4,4) p(4,5) . . .
p(5,1) p(5,2) p(5,3) p(5,4) p(5,5) . . .
p(6,1) p(6,2) p(6,3) p(6,4) p(6,5) . . .
p(7,1) p(7,2) p(7,3) p(7,4) p(7,5) . . .
p(8,1) p(8,2) p(8,3) p(8,4) p(8,5) . . .
p(9,1) p(9,2) p(9,3) p(9,4) p(9,5) . . .
   .      .      .      .      .
   .      .      .      .      .
   .      .      .      .      .

KERNEL ARRAY k(1,1) k(1,2) k(1,3) k(1,4)
k(2,1) k(2,2) k(2,3) k(2,4)
k(3,1) k(3,2) k(3,3) k(3,4)
k(4,1) k(4,2) k(4,3) k(4,4)

SYSTOLIC PROCESSING ELEMENT ARRAY

FROM FIG. 5C

| Clock Cycle # | SRC1/ASA (32 bits) | A | B | PE(1,1) Di(1,1) | PE(1,1) D2(1,1) | PE(2,1) Di(2,1) | PE(2,1) D2(2,1) | PE(1,2) Di(1,2) | PE(1,2) D2(1,2) |
|---|---|---|---|---|---|---|---|---|---|
| 1 | p(1,1)p(2,1)p(3,1)p(4,1) | | | | | | | | |
| 2 | p(5,1)p(6,1)p(7,1)p(8,1) | p(1,1) | | | | | | | |
| 3 | p(1,2)p(2,2)p(3,2)p(4,2) | p(2,1) | | | | | | | |
| 4 | p(5,2)p(6,2)p(7,2)p(8,2) | p(3,1) | | | | | | | |
| 5 | p(1,3)p(2,3)p(3,3)p(4,3) | p(4,1) | p(5,1) | | | | | | |
| 6 | p(5,3)p(6,3)p(7,3)p(8,3) | p(1,2) | p(6,1) | | | | | | |
| 7 | p(1,4)p(2,4)p(3,4)p(4,4) | p(2,2) | p(7,1) | p(1,1) | k(1,1) | | | | |
| 8 | p(5,4)p(6,4)p(7,4)p(8,4) | p(3,2) | p(8,1) | p(2,1) | k(2,1) | | | | |
| 9 | p(1,5)p(2,5)p(3,5)p(4,5) | p(4,2) | p(5,2) | p(3,1) | k(3,1) | | | | |
| 10 | p(5,5)p(6,5)p(7,5)p(8,5) | p(1,3) | p(6,2) | p(4,1) | k(4,1) | | | | |
| 11 | p(1,6)p(2,6)p(3,6)p(4,6) | p(2,3) | p(7,2) | p(1,2) | k(1,2) | p(1,1) | k(1,1) | p(1,1) | k(1,1) |
| 12 | p(5,6)p(6,6)p(7,6)p(8,6) | p(3,3) | p(8,2) | p(2,2) | k(2,2) | p(2,1) | k(2,1) | p(2,1) | k(2,1) |
| 13 | | p(4,3) | p(5,3) | p(3,2) | k(3,2) | p(3,1) | k(3,1) | p(3,1) | k(3,1) |
| 14 | | p(1,4) | p(6,3) | p(4,2) | k(4,2) | p(4,1) | k(4,1) | p(4,1) | k(4,1) |
| 15 | | p(2,4) | p(7,3) | p(1,3) | k(1,3) | p(1,2) | k(1,2) | p(1,2) | k(1,2) |
| 16 | | p(3,4) | p(8,3) | p(2,3) | k(2,3) | p(2,2) | k(2,2) | p(2,2) | k(2,2) |
| 17 | | p(4,4) | p(5,4) | p(3,3) | k(3,3) | p(3,2) | k(3,2) | p(3,2) | k(3,2) |
| 18 | | p(1,5) | p(6,4) | p(4,3) | k(4,3) | p(4,2) | k(4,2) | p(4,2) | k(4,2) |
| 19 | | p(2,5) | p(7,4) | p(1,4) | k(1,4) | p(1,3) | k(1,3) | p(1,3) | k(1,3) |
| 20 | | p(3,5) | p(8,4) | p(2,4) | k(2,4) | p(2,3) | k(2,3) | p(2,3) | k(2,3) |
| 21 | | p(4,5) | p(5,5) | p(3,4) | k(3,4) | p(3,3) | k(3,3) | p(3,3) | k(3,3) |
| *22 | | p(1,6) | p(6,5) | p(4,4) | k(4,4) | p(4,3) | k(4,3) | p(4,3) | k(4,3) |
| *23 | | p(2,6) | p(7,5) | p(1,5) | k(1,5) | p(1,4) | k(1,4) | p(1,4) | k(1,4) |
| 24 | | p(3,6) | p(8,5) | p(2,5) | k(2,5) | p(2,4) | k(2,4) | p(2,4) | k(2,4) |

*FIGURE 5D*

|        | COL 1 | COL 2 | COL 3 | . | . | . | COL L |
|--------|-------|-------|-------|---|---|---|-------|
| ROW 1  | 1     | L+1   | 2L+1  | . | . | . | $L^2-L$ |
| ROW 2  | 2     | L+2   | 2L+2  |   |   |   |       |
| ROW 3  | 3     | L+3   | 2L+3  |   |   |   |       |
| .      | .     | .     | .     |   |   |   |       |
| .      | .     | .     | .     |   |   |   |       |
| .      | .     | .     | .     |   |   |   |       |
| ROW L  | L     | 2L    | 3L    |   |   |   | $L^2$ |

*FIGURE 6A*

| Clock Cycle # | | 1 | 2 | 3 | ... | L | L+1 | L+2 | L+3 | ... | $L^2$-1 | $L^2$ | $L^2$+1 | $L^2$+2 |
|---|---|---|---|---|---|---|---|---|---|---|---|---|---|---|
| CLOCK | | ⎍⎍⎍ | | | | ⎍⎍⎍ | | | | | ⎍⎍⎍ | | | |
| PE(1,1) | D1 | p(1,1) | p(2,1) | p(3,1) | | p(L,1) | p(1,2) | p(2,2) | p(3,2) | | p(L-1,L) | p(L,L) | p(1,L+1) | p(2,L+1) |
| | D2 | k*(1,1) | k(2,1) | k(3,1) | | k(L,1) | k(1,2) | k(2,2) | k(3,2) | | k(L-1,L) | k(L,L) | k*(1,1) | k(1,2) |
| PE(2,1) | D1 | p(1,1) | p(2,1) | p(3,1) | | p(L,1) | p(L+1,1) | p(2,2) | p(3,2) | | p(L-1,L) | p(L,L) | p(L+1,L) | p(2,L+1) |
| | D2 | — | k*(1,1) | k(2,1) | | k(L-1,1) | k(L,1) | k(1,2) | k(2,2) | | k(L-2,L) | k(L-1,L) | k(L,L) | k*(1,1) |
| PE(1,2) | D1 | — | p(1,1) | p(2,1) | | p(L-1,1) | p(L,1) | p(1,2) | p(2,2) | | p(L-2,L) | p(L-1,L) | p(L,L) | p(1,L+1) |
| | D2 | — | — | — | — | — | k*(1,1) | k(2,1) | | | k(L,L-3) | k(L,L-2) | k(L,L-1) | k(1,L) |

*FIGURE 6B*

| | | | | |
|---|---|---|---|---|
| p[0] | p[1] | p[2] | . . . | p[N-1] |
| p[N] | p[N+1] | p[N+2] | . . . | p[2N-1] |
| ... | ... | ... | . . . | ... |
| ... | ... | ... | . . . | ... |
| ... | ... | ... | . . . | ... |
| p[(M-1)N] | p[(M-1)N+1] ... | | . . . | p[MN-1] |

*FIGURE 13*

| | | | |
|---|---|---|---|
| w[0] | w[1] | w[2] | w[3] |
| w[4] | w[5] | w[6] | w[7] |
| w[8] | w[9] | w[10] | w[11] |
| w[12] | w[13] | w[14] | w[15] |

*FIGURE 14*

| | | | |
|---|---|---|---|
| PE[0] | PE[1] | PE[2] | PE[3] |
| PE[4] | PE[5] | PE[6] | PE[7] |
| PE[8] | PE[9] | PE[10] | PE[11] |
| PE[12] | PE[13] | PE[14] | PE[15] |

*FIGURE 15*

| | | | | |
|---|---|---|---|---|
| y[0] | y[1] | y[2] | . . . | y[N-1] |
| y[N] | y[N+1] | y[N+2] | . . . | y[2N-1] |
| . . . | . . . | . . . | . . . | . . . |
| . . . | . . . | . . . | . . . | . . . |
| y[(M-1)N] | y[(M-1)N+1] | . . . | . . . | y[MN-1] |

*FIGURE 16*

| Address | Bank 1 | Bank 2 | Bank 3 | Bank 4 |
| --- | --- | --- | --- | --- |
| 15 | w[15] | w[11] | w[7] | w[3] |
| 14 | w[14] | w[10] | w[6] | w[2] |
| 13 | w[13] | w[9] | w[5] | w[1] |
| 12 | w[12] | w[8] | w[4] | w[0] |
| 11 | w[11] | w[7] | w[3] | w[15] |
| 10 | w[10] | w[6] | w[2] | w[14] |
| 9 | w[9] | w[5] | w[1] | w[13] |
| 8 | w[8] | w[4] | w[0] | w[12] |
| 7 | w[7] | w[3] | w[15] | w[11] |
| 6 | w[6] | w[2] | w[14] | w[10] |
| 5 | w[5] | w[1] | w[13] | w[9] |
| 4 | w[4] | w[0] | w[12] | w[8] |
| 3 | w[3] | w[15] | w[11] | w[7] |
| 2 | w[2] | w[14] | w[10] | w[6] |
| 1 | w[1] | w[13] | w[9] | w[5] |
| 0 | w[0] | w[12] | w[8] | w[4] |

*FIGURE 17*

Pixel Array, p(i,j)

| Time | Pixel Value | Weight Value |
|---|---|---|
| 0 | p[0] | w[0] |
| 1 | p[1] | w[1] |
| 2 | p[2] | w[2] |
| 3 | p[3] | w[3] |
| 4 | p[N] | w[4] |
| 5 | p[N+1] | w[5] |
| 6 | p[N+2] | w[6] |
| 7 | p[N+3] | w[7] |
| 8 | p[2N] | w[8] |
| 9 | p[2N+1] | w[9] |
| 10 | p[2N+2] | w[10] |
| 11 | p[2N+3] | w[11] |
| 12 | p[3N] | w[12] |
| 13 | p[3N+1] | w[13] |
| 14 | p[3N+2] | w[14] |
| 15 | p[3N+3] | w[15] |

*FIGURE 19*

Pixel Array, p(i,j)

Pixel Array, p(i,j)

| Time | (M=A continuously) Pixel Value | Weight Value | Desired Pixel Value | Pixel Value Needed at B by PE[4] | Pixel Value Needed at B by PE[8] | Pixel Value Needed at B by PE[12] |
|---|---|---|---|---|---|---|
| 0 | p[0] | x* | x | x | x | x |
| 1 | p[1] | w[0] | p[1] | -- | x | x |
| 2 | p[2] | w[1] | p[2] | -- | -- | x |
| 3 | p[3] | w[2] | p[3] | -- | -- | -- |
| 4 | p[N] | w[3] | p[4] | p[4] | -- | -- |
| 5 | p[N+1] | w[4] | p[N+1] | -- | p[5] | -- |
| 6 | p[N+2] | w[5] | p[N+2] | -- | -- | p[6] |
| 7 | p[N+3] | w[6] | p[N+3] | -- | -- | -- |
| 8 | p[2N] | w[7] | p[N+4] | p[N+4] | -- | -- |
| 9 | p[2N+1] | w[8] | p[2N+1] | -- | p[N+5] | -- |
| 10 | p[2N+2] | w[9] | p[2N+2] | -- | -- | p[N+6] |
| 11 | p[2N+3] | w[10] | p[2N+3] | -- | -- | -- |
| 12 | p[3N] | w[11] | p[2N+4] | p[2N+4] | -- | -- |
| 13 | p[3N+1] | w[12] | p[3N+1] | -- | p[2N+5] | -- |
| 14 | p[3N+2] | w[13] | p[3N+2] | -- | -- | p[2N+6] |
| 15 | p[3N+3] | w[14] | p[3N+3] | -- | -- | -- |
| 16 | p[4N] | w[15] | p[3N+4] | p[3N+4] | -- | -- |
| 17 | p[4N+1] | w[0] | p[4N+1] | -- | p[3N+5] | -- |
| 18 | p[4N+2] | w[1] | p[4N+2] | -- | -- | p[3N+6] |

*Note: x= "don't care" value

FIGURE 22

Pixel Array, p(i,j)

Pixel Array, p(i,j)

Pixel Array, p(i,j)

Pixel Array, p(i,j)

Pixel Array, p(i,j)

Pixel Array, p(i,j)

| Time | Pixel Value | Weight Value |
|---|---|---|
| 0 | p[0] | w[12] |
| 1 | p[1] | w[13] |
| 2 | p[2] | w[14] |
| 3 | p[3] | w[15] |
| 4 | p[N] | w[0] |
| 5 | p[N+1] | w[1] |
| 6 | p[N+2] | w[2] |
| 7 | p[N+3] | w[3] |
| 8 | p[2N] | w[4] |
| 9 | p[2N+1] | w[5] |
| 10 | p[2N+2] | w[6] |
| 11 | p[2N+3] | w[7] |
| 12 | p[3N] | w[8] |
| 13 | p[3N+1] | w[9] |
| 14 | p[3N+2] | w[10] |
| 15 | p[3N+3] | w[11] |
| 16 | p[4N] | w[12] |
| 17 | p[4N+1] | w[13] |
| 18 | p[4N+2] | w[14] |
| 19 | p[4N+3] | w[15] |
| 20 | p[5N] | w[0] |
| 21 | p[5N+1] | w[1] |

*FIGURE 29*

Pixel Array, p(i,j)

Pixel Array, p(i,j)

| Address | Bank 1 | Bank 2 | Bank 3 | Bank 4 |
|---|---|---|---|---|
| 63 | w[63] | w[55] | w[47] | w[39] |
| 62 | w[62] | w[54] | w[46] | w[38] |
| ... | ... | ... | ... | ... |
| ... | ... | ... | ... | ... |
| ... | ... | ... | ... | ... |
| 17 | w[17] | w[9] | w[1] | w[57] |
| 16 | w[16] | w[8] | w[0] | w[56] |
| 15 | w[15] | w[7] | w[63] | w[55] |
| 14 | w[14] | w[6] | w[62] | w[54] |
| 13 | w[13] | w[5] | w[61] | w[53] |
| 12 | w[12] | w[4] | w[60] | w[52] |
| 11 | w[11] | w[3] | w[59] | w[51] |
| 10 | w[10] | w[2] | w[58] | w[50] |
| 9 | w[9] | w[1] | w[57] | w[49] |
| 8 | w[8] | w[0] | w[56] | w[48] |
| 7 | w[7] | w[63] | w[55] | w[47] |
| 6 | w[6] | w[62] | w[54] | w[46] |
| 5 | w[5] | w[61] | w[53] | w[45] |
| 4 | w[4] | w[60] | w[52] | w[44] |
| 3 | w[3] | w[59] | w[51] | w[43] |
| 2 | w[2] | w[58] | w[50] | w[42] |
| 1 | w[1] | w[57] | w[49] | w[41] |
| 0 | w[0] | w[56] | w[48] | w[40] |

*FIGURE 32*

Pixel Array, p(i,j)

| | | | |
|---|---|---|---|
| w[0] | w[1] | w[2] | 0 |
| w[4] | w[5] | w[6] | 0 |
| w[8] | w[9] | w[10] | 0 |
| 0 | 0 | 0 | 0 |

SYSTOLIC ARRAY IMAGE PROCESSING SYSTEM AND METHOD

This application is a continuation-in-part of U.S. patent application Ser. No. 07/419,040, filed Oct. 10, 1989, now U.S. Pat. No. 5,138,695.

FIELD OF THE INVENTION

This invention relates to a new architecture for a two-dimensional systolic array of processing elements that can efficiently calculate the two-dimensional convolution of a kernel of arbitrary size. The systolic array architecture is also efficiently organized to calculate the outputs of a two-layer neural network that includes fully- or partially-connected, feedforward processing elements. The systolic array architecture is further efficiently organized to calculate the outputs of a cooperative-competitive neural network.

BACKGROUND OF THE INVENTION

The algorithms of signal processing and image processing often treat data as a two-dimensional array of numbers. In image processing, the image itself is a two-dimensional array of values called pixels. In acoustic signal processing, a two-dimensional array of spectral coefficients distributed in time and frequency is often used. General purpose computers are usually too slow for real time processing of this type of data. The data rates are high, the processing required for many algorithms is extensive, and the throughput rate often requires a massively parallel approach to processing the data. Systolic arrays provide a solution to these obstacles in many cases.

A systolic array of processors has the capability of matching the data flow through the device to the algorithms used in image and signal processing. In neural network image processing, neural networks of different sizes and connectivity are often applied to an image during the process of transforming raw pixel data into feature vectors that serve to recognize and classify objects within the image. A systolic array is a network of processors that rhythmically compute and pass data through the network.

Most systolic arrays are designed and built as a hardware implementation of a particular algorithm. In such cases the array can execute the algorithm for a problem of a specific size (or a limited number of sizes). For example, one commercially available convolution chip can be configured to perform convolutions up to any kernel size, N×M, as long as N and M are both 8 or less. Another commercially available chip can perform either a 3×7 convolution or a 1×21 convolution. If it is necessary to execute the same algorithm for a problem of a larger size, then a larger systolic array must be built or else the convolution must be implemented in software. This software implementation is generally cumbersome and time consuming, and the overall performance of the array declines drastically when the convolution problem exceeds the physical size of the systolic array. A typical systolic array chip that has a 3×3 array of processing elements can perform a 3×3 convolution on a 512×512 image in 6–7 milliseconds. However, a 4×4 or 5×5 convolution cannot be done in this hardware, and the host processor will require several seconds or more to compute such convolutions.

The large increase in processing time usually encountered when the kernel size increases beyond a certain size has led researchers and users to develop their algorithms and applications with small kernels. This has been true in spite of the better performance of larger kernel algorithms such as the edge enhancement algorithm using the Laplacian of a Gaussian kernel whose performance is less noise dependent when the kernel size becomes 7×7 or larger. In general, the edge enhancement algorithms that use a large kernel are less noisy than those that use a small kernel.

SUMMARY OF THE INVENTION

In accordance with the present invention, convolutions can be performed of an arbitrary kernel size without building a new array or adding additional chips. This is particularly useful in neural network image processing for transforming raw pixel data into feature vectors for classifying and recognizing objects within the image. This is accomplished according to one embodiment of the present invention by each processing element of the systolic array computing the complete results of the convolution as both the kernel values and the pixel values propagate past the processing element.

The present invention includes a novel system for feeding the pixel value data to the various processing elements that compute the convolution. In a conventional data flow system, pixel values are read sequentially according to some given scheme, typically a raster scan of an image, to form a data stream which is fed to a number of delay lines. Each delay line has a delay equal to the length of an image scan line. The output of each delay line feeds the input of the next delay line. After all the delay lines are full, the outputs of the delay lines also feed the convolutional processor. On a typical conventional system that performs an 8×8 convolution on a 512×512 image, eight delay lines of length 512 are required.

The system of this invention, in contrast, does not require delay lines or any similar methods. Instead, the pixel data stream flows to the processing elements through two parallel independent data channels. A relative "delay" between these channels can be produced by starting their respective data scans at different addresses in the raster pattern. The data arriving at the processing elements is governed by multiplexors that select data from one or the other of these two channels. Thus, the effective "time delays" are produced by the software controlling the pixel data scans and multiplexors.

BRIEF DESCRIPTION OF THE DRAWINGS

FIGS. 5A and 5B are charts illustrating Port A and Port B pixel scan and the clock cycle timing therefor according to the present invention;

FIG. 5C is a diagram of the image pixel array, kernel array, and processing element array, which defines the elements of these arrays;

FIG. 5D is a chart illustrating the timing of a 4×4 convolution with the contents of registers according to the present invention;

FIGS. 6A and 6B are charts illustrating a convolution kernel scan and clock cycle timing therefor according to the present invention;

FIG. 13 is a diagram of an array of image pixels defined by M rows and N columns, labelled sequentially according to a raster scan pattern;

FIG. 14 is a diagram of an array of 16 kernel weights for a 4×4 convolution, labelled sequentially according to a raster scan pattern;

FIG. 15 is a diagram of the 4×4 array of processing elements shown in FIG. 12, labelled sequentially;

FIG. 16 is a diagram of the array resulting from the convolution of the image pixels of FIG. 13 with the kernel weights of FIG. 14;

FIG. 17 is a diagram of the kernel weight values of FIG. 14 stored in external RAM banks;

FIG. 19 is a diagram of the weight and pixel values at processing element PE[0] of FIG. 15 for the first 16 clock cycles;

FIG. 22 is a diagram of the weight and pixel values that would arrive at processing element PE[4] of FIG. 15 for the first 18 clock cycles if the multiplexor M1 of FIG. 12 were connected to the data source channel A continuously, and the pixel values from data source channel B that are needed by PE[4], PE[8] and PE[12] to compute the convolution correctly;

FIG. 29 is a diagram of the weight and pixel values at processing element PE[1] of FIG. 15 for the first 21 clock cycles;

FIG. 32 is a diagram of the kernel weight values for an 8×8 convolution stored in external RAM banks of the 4×4 array of processing elements of FIG. 12;

FIG. 34 is a diagram of an array of 16 kernel weights for a 3×3 convolution, labelled in the same manner as in FIG. 14.

DESCRIPTION OF THE INVENTION

Figure 1:
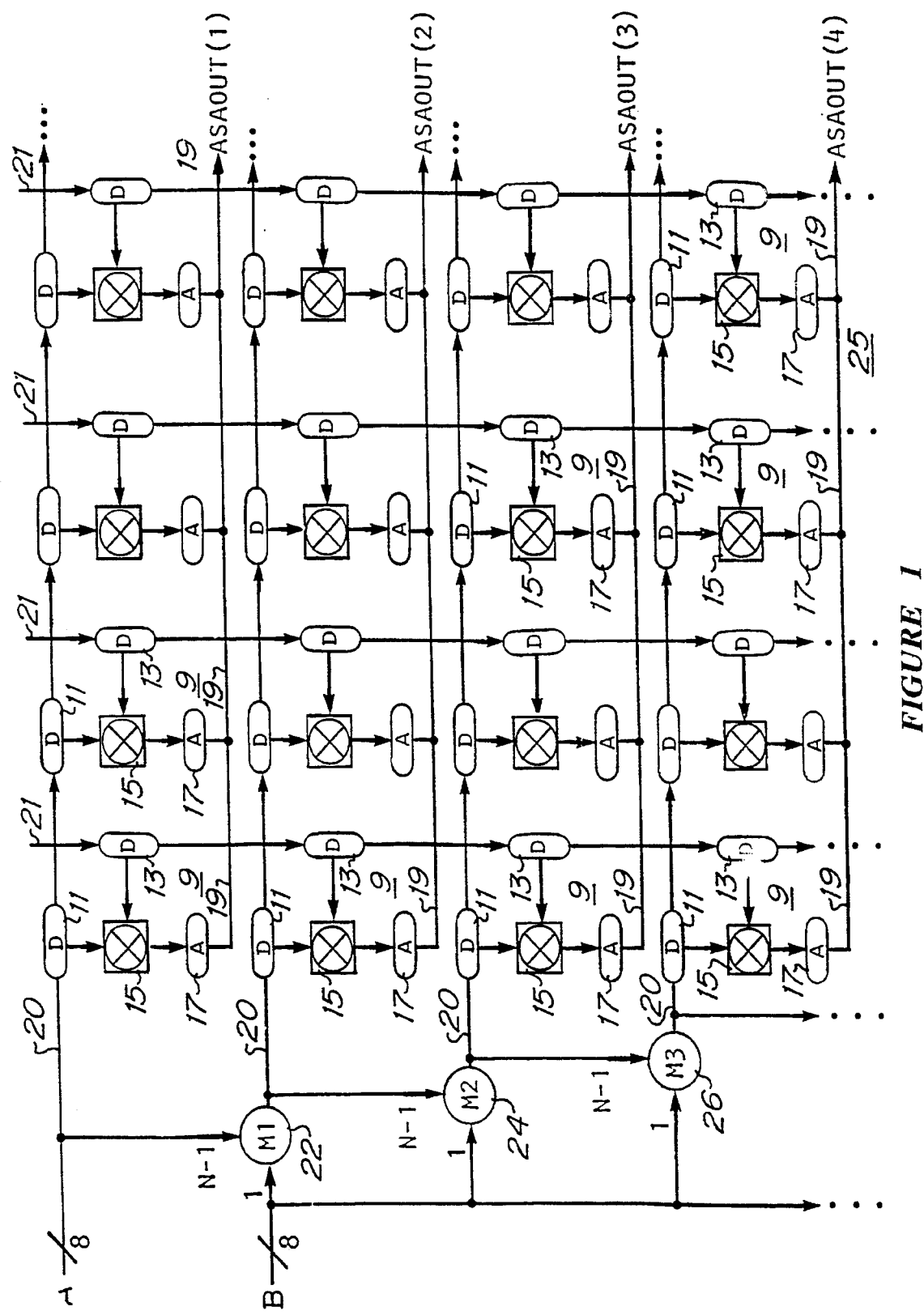
FIG. 1 is a block schematic diagram of one systolic array according to the present invention.
Figure 2:
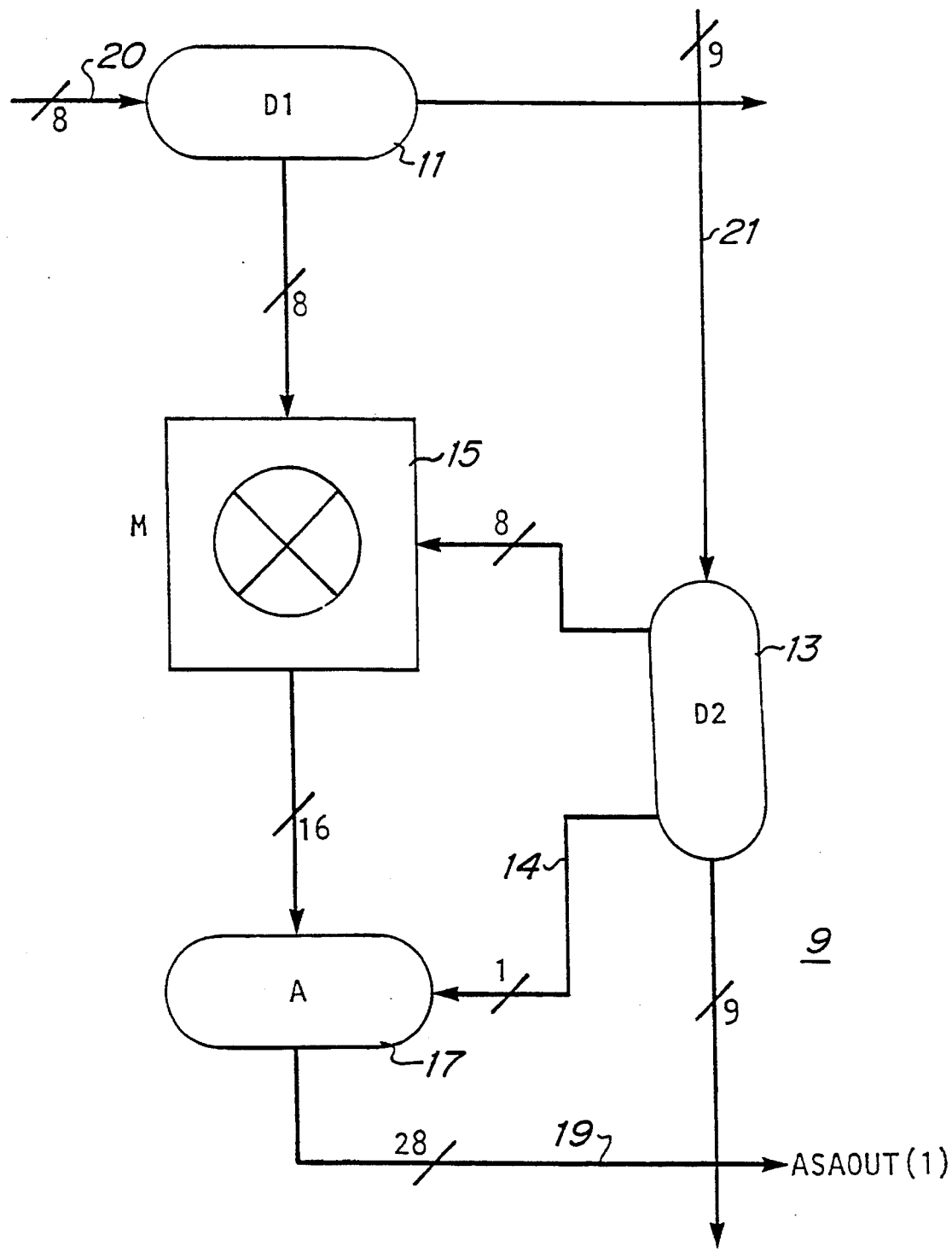
FIG. 2 is a block schematic diagram of a systolic array processing element within the embodiment illustrated in FIG. 1.

Referring first to FIG. 2, there is shown a block schematic diagram of a processing element 9 including a data register 11, another data register 13, a multiplier 15, and an accumulator 17. For simplicity, clock lines for signals that synchronize the data transfer from element to element are not shown, but it should be understood that such clock lines and signals are included in an embodiment of the present invention, for example, as illustrated in FIG. 1. FIG. 1 illustrates a 4×4 systolic array of the processing elements 9 of FIG. 1, but the array can be any reasonable size. Each processing element 9, as illustrated in FIG. 2, includes inputs 20 and 21, and output 19, and each such data path is shown with a specific number of bits. However, the number of bits in the illustrated embodiments is dependent on technology and cost considerations, and the illustrated numbers of bits represent typical numbers for an image processing application using state-of-the art VLSI technology. Of course, clock signals are also connected to be applied in a conventional manner to the data registers 11, 13, and to the multipliers and accumulators 15 and 17 throughout the array (not shown).

For a typical image processing convolution application, each processing element 9 performs the following on each clock cycle: 8-bit pixel data flows into a register 11 from the register of a previous element; an 8-bit kernel weight value flows into register 13 from the register 13 in a previous element, the values in the registers 11 and 13 are multiplied in the multiplier 15, and the 16-bit result of the multiplier is accumulated in the accumulator 17. The kernel size of the convolution determines when the accumulator register value is placed onto the 28-pin output bus 19. A ninth control bit 14 is added to the data path 21 for the kernel weights to synchronize the beginning and end of the kernel. The control bit is used to place the value of the accumulator 17 on the 28-bit ASAOUT(I) bus 19 and to restart the next accumulation.

The ability of this systolic array to compute a two-dimensional convolution of arbitrary kernel window size with a fixed number of processing elements 9 in an N×N array is due to the structure of each element and to the manner in which the data 20 and weights 21 flow into the array from external memory. The weights 21 are illustrated in FIG. 1 as arriving at the boundary of the systolic array on N independent data paths 21. The data 20 is illustrated as arriving on two independent paths A and B, and then being multiplexed into the array on N paths 20. Typical chip circuitry 44 to accomplish this task are shown in FIG. 3.

Figure 3:
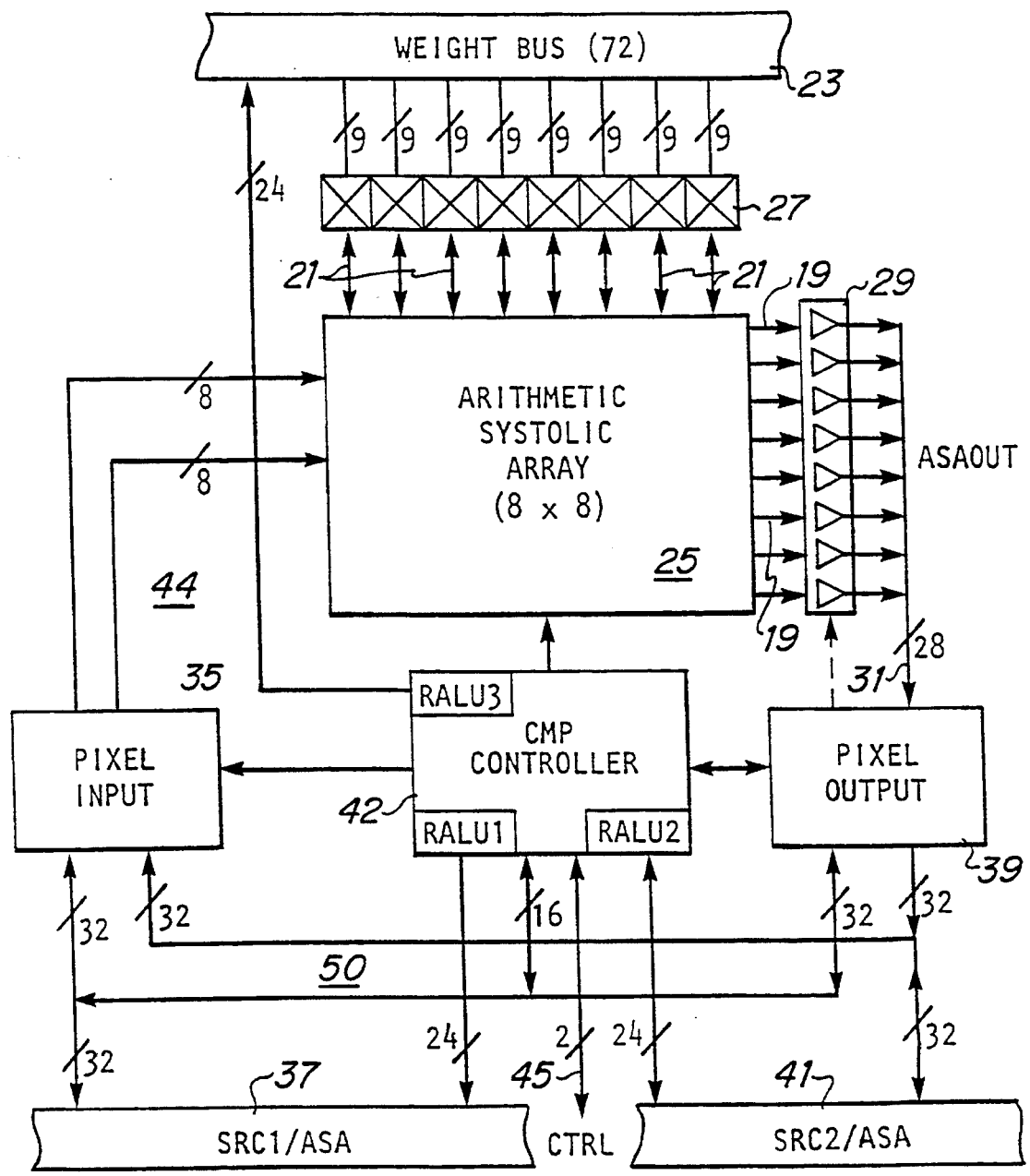
FIG. 3 is a pictorial diagram of circuit arrangements on an integrated circuit chip in accordance with the present inventions.
Figure 4A:
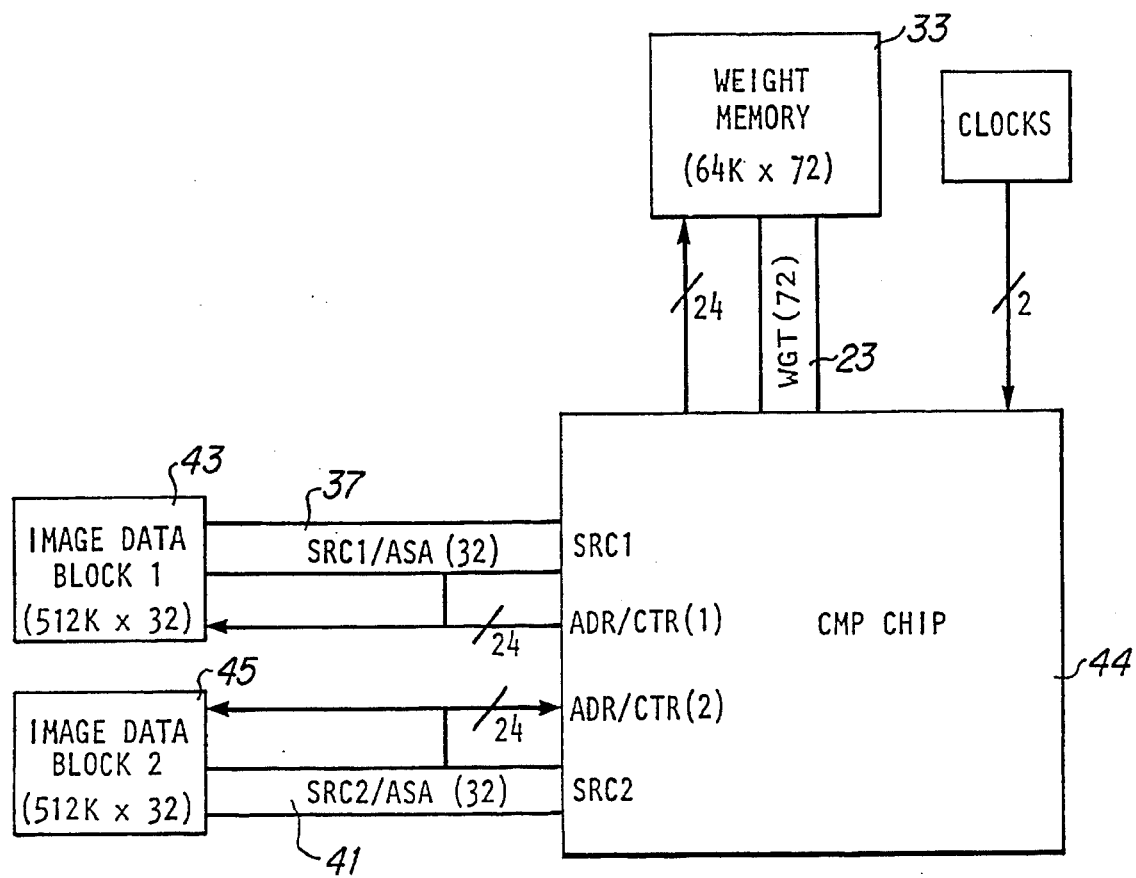
FIGS. 4A and 4B are block schematic diagrams of external memory interfaces and the internal CMP chip controller for operation according to the present invention.
Figure 4B:
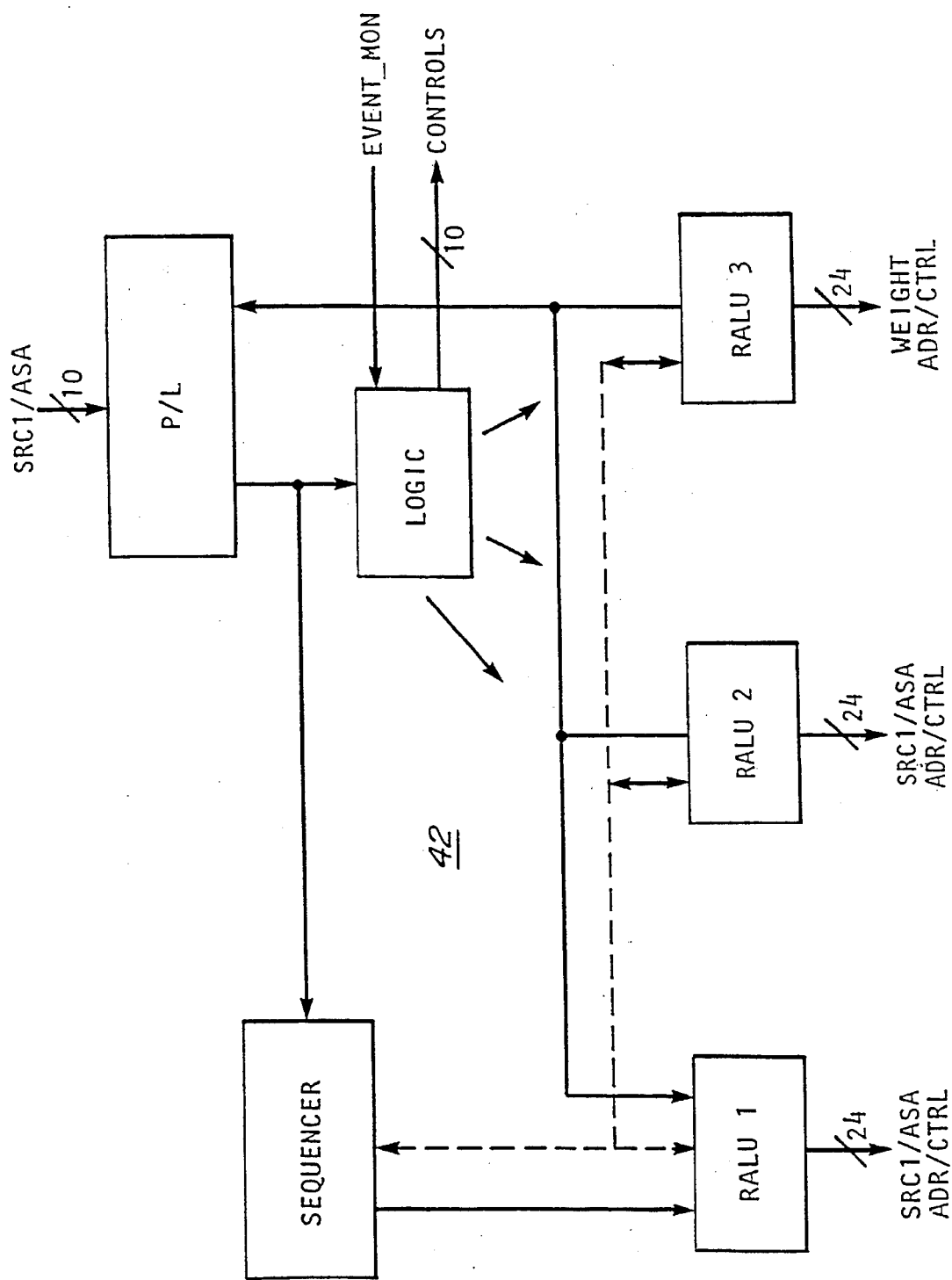
Figure 8:
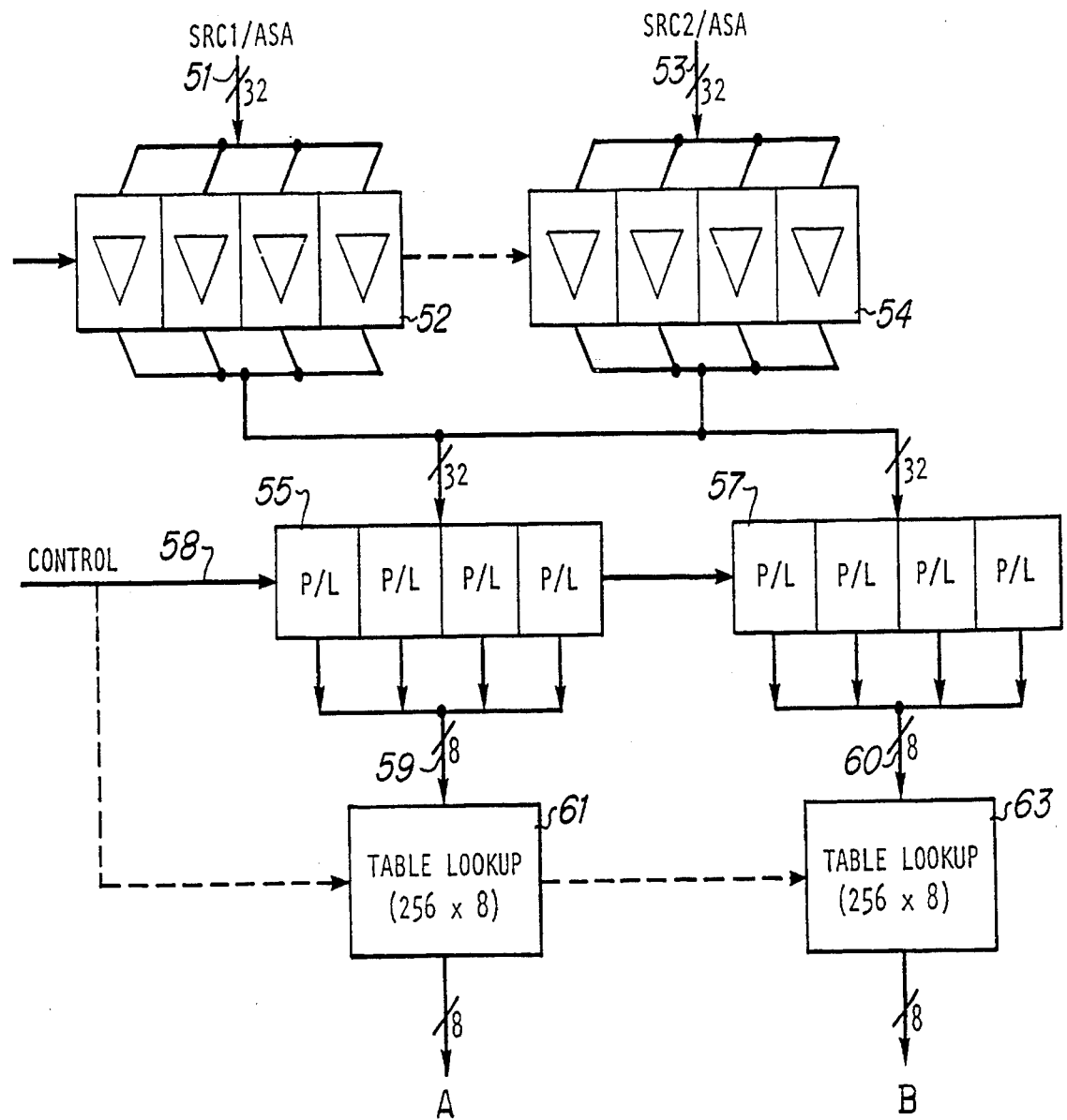
FIG. 8 is a block schematic diagram of the pixel input circuitry according to one embodiment of the present invention.
Figure 9:
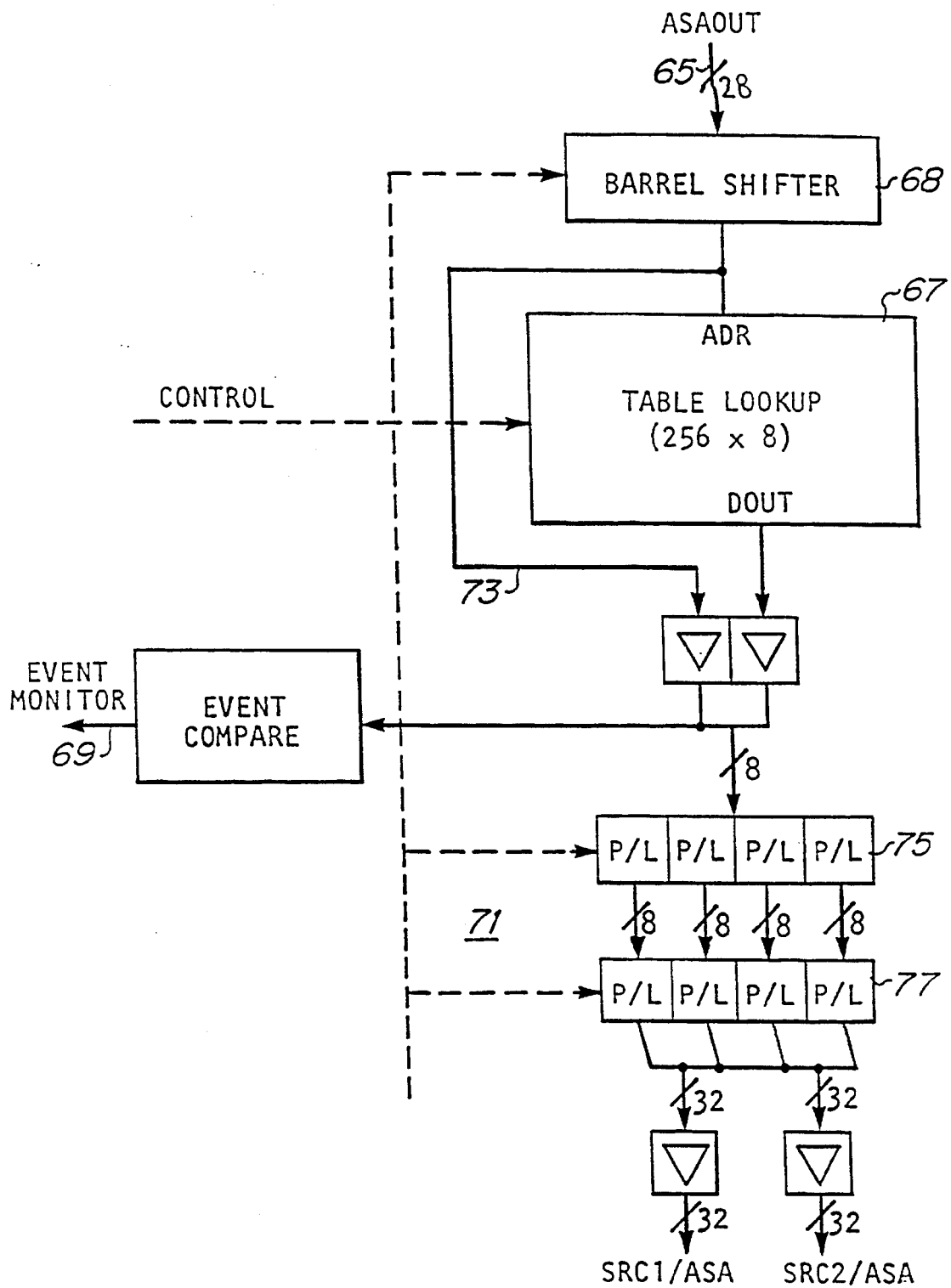
FIG. 9 is a block schematic diagram of a pixel output circuit according to one embodiment of the present invention.

With reference to the block schematic diagram of FIG. 3, there is shown an 8×8 systolic array including processing elements 9 of FIG. 2 arranged in a systolic array that is similar to the circuitry illustrated in FIG. 1, and that is extended (on the right) by an additional four independent weight inputs 21 and (at the bottom) by four additional data inputs 20. The weight bus 23 of weight inputs is connected to the systolic array 25 via individual drivers 27 that provide bi-directional signal transfers between the weight bus 23 and the array 25. The bi-directionality of the drivers 27 permit the weights to be stored in the general purpose image data block memory 43 and 45 as illustrated in FIG. 4. The weights for a specific kernel may then be loaded from the image data block as required for the desired convolution or neural network operation of the invention. Also, the output buses 19 of the array are connected via individual amplifiers 29 to the common output 31, and the inputs A and B are successively multiplexed 22, 24, 26 for application to the array as data inputs 20 in the manner illustrated in FIG. 1. The weight bus 23 is connected to external memory 33, as illustrated in FIG. 4, and the pixel inputs A and B are connected via pixel input circuitry 35, as illustrated in FIG. 8 (described later herein), to the input bus 37, 41 while the output bus 31 is connected via pixel output circuitry 39, as illustrated in FIG. 9 (described later herein), to the output bus 37, 41. These connections to the buses 37 and 41 are interchangeable 50 to enhance throughput by facilitating the interchangeable connections to separate banks of memory 43 and 45 as illustrated in FIG. 4A. The chip controller 42, as illustrated in FIG. 4A, is a hierarchical control scheme which is loosely coupled 45 with an external control microprocessor (not shown). The external microprocessor executes the less structured portions (e.g. loading values in table lookups 61 and 63 of FIG. 8) of an algorithm in a conventional manner.

The bandwidth requirement of the pixel memory is reduced through interleaving by increasing the bus width to 32-bits. This also reduces the addressing bandwidth required by the external microprocessor. In similar fashion, the hierarchical control that is used allows the external microprocessor to load higher level control registers on the chip, allowing the controller 42 embedded in the chip 44 to execute the lower level, cycle by cycle control.

Example control registers loaded by the external microprocessor indicate which post-processing functions are required, initialize table lookups, and specify kernel size. This hierarchy of instructions allows new user-developed algorithms to be tailored to the chip through high-order languages, requiring only additional library routines that load chip registers to be developed as needed.

In order to simplify the chip controller, control of the arithmetic systolic array 25 is not cell-dependent, that is, individual cell control signals are not required as they are developed from the data flow. For example, the control signal that indicates that we have finished a weighted-sum or convolution window is encoded as a ninth bit of the kernel memory and systolically passes from cell-to-cell at the correct time.

In addition, control flags from the chip 44 are provided to the external microprocessor to indicate high priority events for which a quick response, low latency, is needed. An example of this is the completion of a convolution.

Figure 5A:
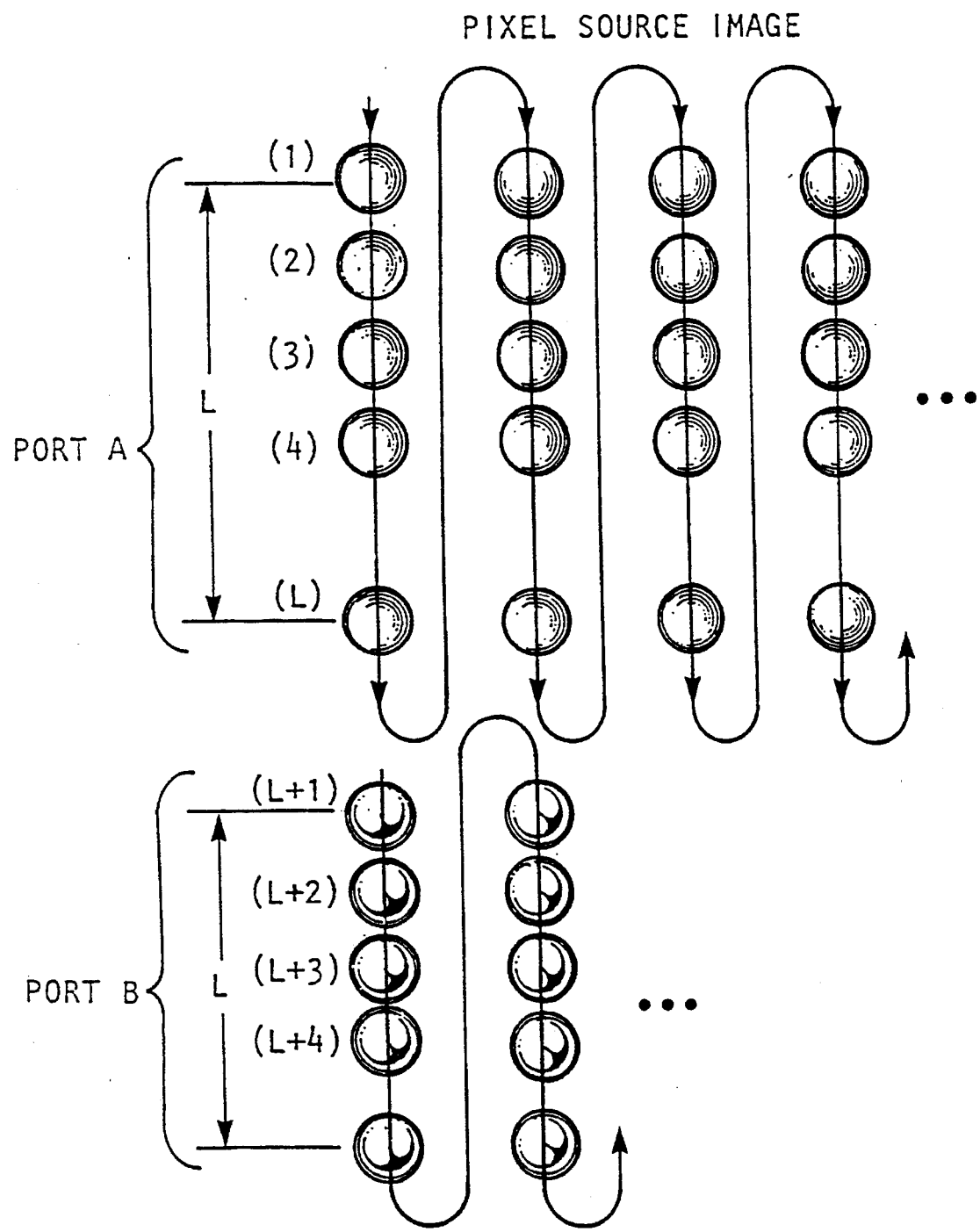
Figure 5B:
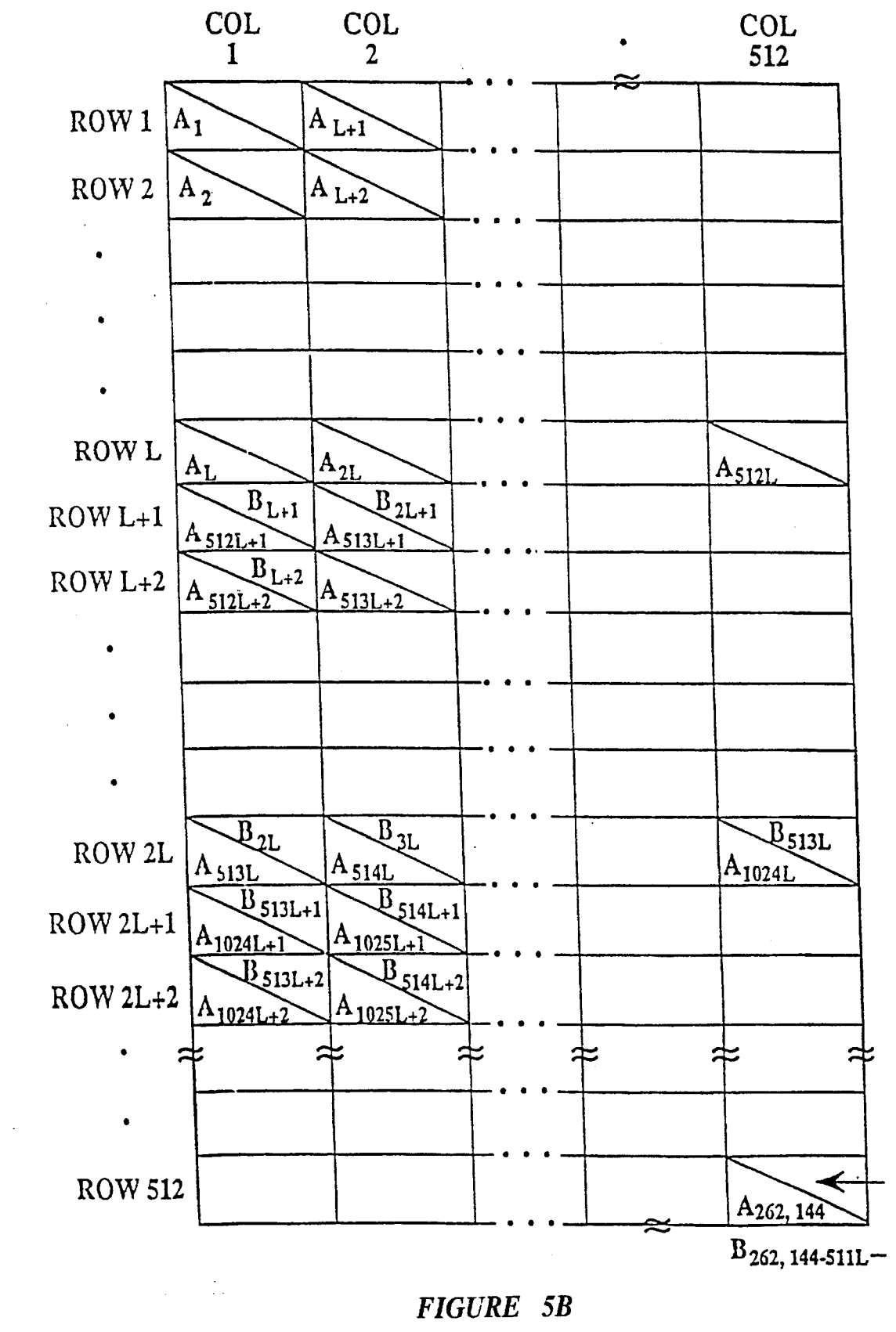

In operation, for example, on an image residing in an image data block 43 as a source of input data, the systolic array 25 of the system described herein scans the source image data vertically in a lexical manner, as illustrated in FIGS. 5A and 5B. Each row of processing elements 9 has its own unique source inputs. For example, let the image be of size 512×512 pixels, represented by an array of pixel values $p(i,j)$; the systolic array be of size 8×8; and the kernel be of size L×L, where L is larger than 8. Port A scans the first L rows beginning at row 1 in the manner shown, and Port B (delayed by L cycles) scans the L rows beginning at row L+1. After scanning the first L rows, Port A continues scanning the next L rows at row L+1, and after the L cycle delay, Port B begins scanning at row 2L+1. Port B continues its scan similarly, L rows at a time. FIG. 5B illustrates the scan pattern of the image for input ports A and B for an L×L convolution on a 512×512 image. The subscripts on A and B represent the clock cycle on which the image pixel value is retrieved from memory and placed on the respective port. There are a total of 512×512=262,144 clock cycles in a complete scan. FIG. 5C shows a diagram of the arrays of image pixels, kernel weights, and systolic processing elements, which serves to define the notation for the elements of these various arrays. FIG. 5D illustrates the contents of the registers as a function of clock cycle number for a 4×4 convolution, according to the notation shown in FIG. 5C. All of the registers shown are 8 bits except the SRC1/ASA register which is 32 bits. Only the first 24 clock cycles are illustrated. However, the pattern remains the same. Every 4 clock cycles, the multiplexor M1 22 samples the B input and places the results in the D1 register 11 of PE(2,1). It should be noted that on clock cycles 22 and 23 the first convolution calculations are complete for PE(1,1) and PE(2,1), respectively. Results are transferred to the ASAOUT(1) and ASAOUT(2) busses 19, respectively, as the initial kernel value k(1,1) arrives at the processing element.

The scan of an L×L kernel is illustrated in FIGS. 6A and 6B. Let the array of kernel values be $k(i,j)$ where i is the row number and j is the column number. The values $k(i,j)$ flow down the vertical paths 21 of FIG. 1 in the numerical order illustrated in FIG. 6A. This figure illustrates a scan pattern of an L×L convolution kernel. The number represents the clock cycle on which the kernel value is retrieved from memory.

The processing elements are denoted by a similar notation to the pixels as shown in the diagram of FIG. 5C. PE(i,j) represents the $(i,j)^{th}$ processing element, where i is the row and j is the column. PE(1,1) completes the computation of the $(1,1)^{th}$ convolution output after $L^2$ cycles. FIG. 6B is a timing diagram that illustrates the relationship between the kernel values, the pixel values, and the processing elements in the systolic array timing diagram. Pixel array values and kernel array values are shown in each of the D1 and D2 registers as a function of clock cycle numbers for PE(1,1), PE(2,1), and PE(1,2). The weight k*(1,1) carries the ninth control bit 14 that places the accumulator 17 register value on the output bus 19, and zeros the accumulator. That output value is the accumulated sum of products and equals the convolution output value. In the case of PE(1,1), we see from FIG. 6B that after $L^2$ cycles the value delivered by the accumulator to the ASAOUT output bus is given by:

$$O(1,1) = \sum_{i,j=1}^{L^2} p(i,j)k(i,j). \tag{1}$$

Referring still to FIG. 6B, the (−) symbol denotes "don't care" values. Note that the kernel values k(i,j) in D2 of PE(2,1) are simply delayed by one clock cycle as we move from D2 of processing element PE(1,1) to D2 of PE(2,1) in the vertical direction. The pixel values in D1 of PE(1,1) and PE(2,1) are identical except at cycle L+1 when the pixel value from Port B is switched into register D1 of PE(2,1). A pixel value from Port B is switched into register D1 of PE(2,1) every L cycles thereafter.

Also note that as we move in the horizontal direction from processing element PE(1,1) to PE(1,2), the pixel values are simply delayed by one clock cycle. The commencement of the flow of the kernel values is delayed by L+1 clock cycles for each column at the top of the systolic array. Each accumulator does not begin to produce valid results until the first kernel value k(1,1) arrives. PE(1,2) completes the computation of the output O(1,2) $L^2$ cycles later:

$$O(1,2) = \sum_{i,j=1}^{L^2} p(i,j+1)k(i,j). \tag{2}$$

The convolution weights are similarly delayed for the third and each subsequent PE in the top row.

Figure 7:
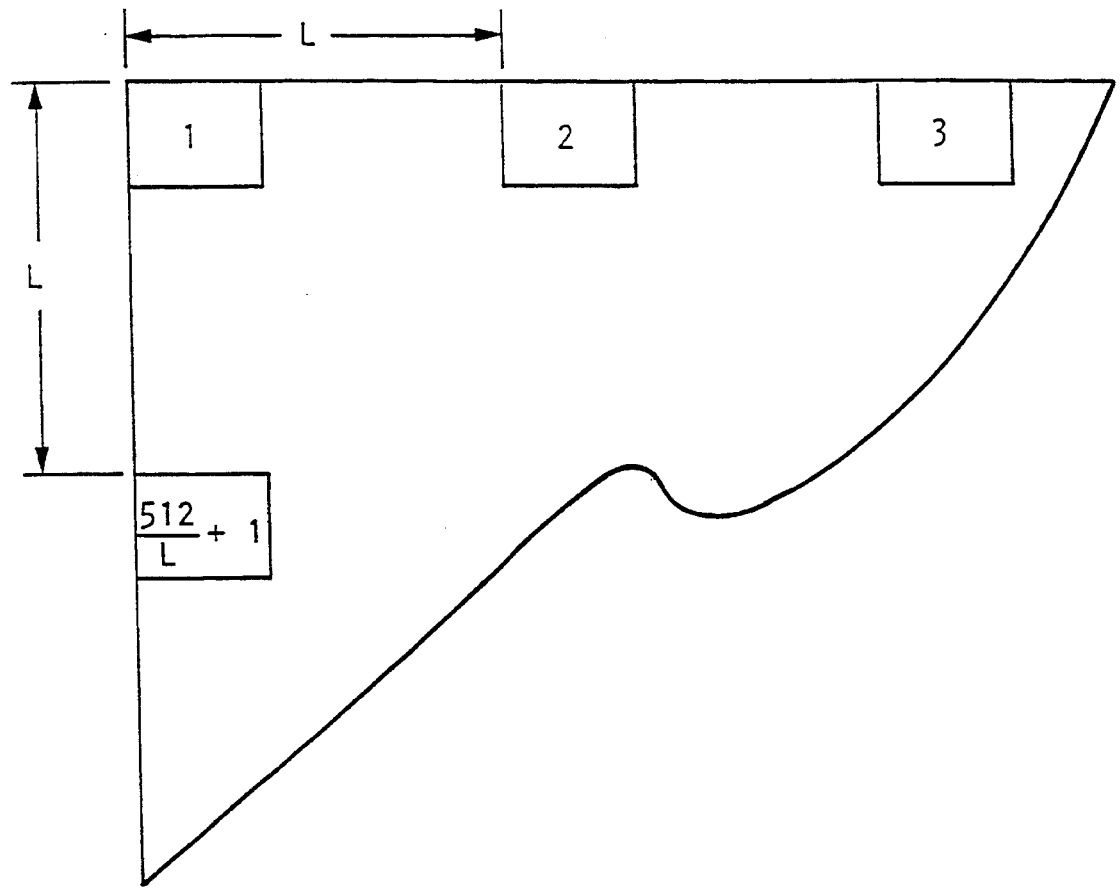
FIG. 7 is a chart illustrating the output sequence pattern according to the present invention.

In the second row, PE(2,1) gets its first L-1 pixels from the A data path from multiplexors 22, as illustrated in FIG. 1. After L-1 clock cycles, PE(2,1) needs the first pixel of the B data scan. This pixel is provided by the multiplexor 22. In a similar manner, the multiplexor 24 provides the correct data to enter the third row and so on down to the eighth row of the 8×8 systolic array of processing elements. In one complete scan through the image, the systolic array completes a pattern of 8×8 blocks of L×L convolution outputs, as illustrated in FIG. 7. If L is greater than 8, it is necessary to rescan the array several times to fill in the blocks of coefficients not computed on previous scans. The number of required re-scans, K, is given by the formula:

$$K=L^2/N^2, \tag{3}$$

where N=8, the number of processing elements in each row and column in the illustrated embodiment. The systolic array 25 is thus able to compute a two-dimensional convolution (for example, of an optical image) of arbitrary size, limited only by the size of the external weight memory 33 that stores the kernel values, as illustrated in FIG. 4A.

Feedforward, Fully-Connected Neural Network Mode

In a feedforward, fully-connected neural network, such as encountered in backpropagation, each processing element 9 has an independent set of weights 21 that it uses to process the input data 20. For this mode, the data will flow in Port A in FIG. 3, and the weights will enter the eight independent channels from the weight bus as illustrated in FIG. 3. Only the top row of the systolic array is active in the fully-connected neural network mode. Each systolic array cell represents a neuron that performs the dot product of a set of weights with the input data. This case is distinguished from the convolution mode in which the weights flowing into each column of the systolic array were delayed versions of the same set of weights. Each processing element in the top row of the systolic array represents a single neuron in a fully connected layer of a feedforward neural network. The systolic array can efficiently compute the outputs of eight of the N neurons in the layer of the neural network in parallel. If N is greater than eight, then the input data and weights must pass through the systolic array for each set of eight neurons. Each processing element, PE(1,i) for $1 \leq i \leq 8$, computes the following output O(1,i):

$$O(1,i) = \sum_{j=1}^{M} W_{ij}X_j, \quad 1 \leq i \leq 8, \tag{4}$$

where the $W_{ij}$ flow down the vertical paths 21 and $X_j$ flow across the first row path 20. M is the number of input neurons in the previous layer of the simulated neural network.

Cooperative Competitive Neural Network Mode

A cooperative, competitive neural network is characterized by a process in which neurons on the same plane interact with one another. The most common form of competition is the on-center off-surround interaction, as follows. Let the outputs of a feedforward neural network that has operated on an image plane of N×N pixels be expressed as f(i,j). These output values can be thought of as a transformation of the pixel image into a new image. Each output pixel f(i,j) interacts with its surrounding neighbors in competition by comparing its value to all the surrounding values in order to reach a conclusion as to which pixels have relatively large values. Those that have small values are repressed and those which have large values are enhanced. Several known specific neural networks such as Grossberg's Boundary Contour System (BCS), Masking Fields, and Kohonen Learning have effectively applied competitive image processing functions.

One of the keys to competition is computing the average of the pixels over the neighborhood. For illustration, consider a 3×3 region in which the center pixel is the on-center pixel and the other eight surrounding pixels are the off-surround. A 3×3 matrix F illustrates this interaction symbolically as:

$$F_{ij} = \begin{bmatrix} S & S & S \\ S & C & S \\ S & S & S \end{bmatrix}, \tag{5}$$

where C denotes center and S denotes surround.

Each pixel labelled as a surround pixel in the above matrix is itself a center pixel with its own on-center off-surround interaction in the larger image. The algorithm requires us to produce a moving average and compare each pixel to that average. The moving average can be done by a convolution with a kernel that has equal values in all of its cells. Thus, a second output plane of pixels, g(i,j) is produced that contains local average values by a convolution process with a weight matrix:

$$W_{i,j} = \frac{1}{8} \begin{bmatrix} 1 & 1 & 1 \\ 1 & 0 & 1 \\ 1 & 1 & 1 \end{bmatrix}. \tag{6}$$

The competition is done by then comparing the value f(i,j) to the value g(i,j) by means of subtraction. The competition algorithm requires that if the on-center pixel has a value that is greater than a factor α times the average value, then it should be enhanced. The comparison and the multiplication of the average value by α can all be done in the convolution kernel by using a kernel of the form:

$$W_{i,j} = \frac{1}{8} \begin{bmatrix} -\alpha & -\alpha & -\alpha \\ -\alpha & +8 & -\alpha \\ -\alpha & -\alpha & -\alpha \end{bmatrix}, \tag{7}$$

where α is typically of the order of 1.3. The result is then passed through a non-linear thresholding function such as the Logistic sigmoid. A new pixel plane is thus built with the outputs. The same on-center off-surround process is repeated with the new pixel plane. This is a neural network relaxation process. The invention is able to implement this interaction by means of an iterative relaxation technique that makes use of repeated convolutions of the data passed through the systolic array, together with the pre- and post-processing table look-up functions that can implement the thresholding function, as illustrated in FIGS. 8 and 9.

Referring now to FIG. 8, there is shown the pixel input block diagram which operates with the pixels organized in RAM into 32-bit words so that 4 pixels can be read out or stored in one memory cycle. This organization allows the pixel throughput rate to more easily match the on-chip speed of the systolic array portion of the CMP chip. Separate interfaces 51, 53 from two sources are illustrated, each capable of being multiplexed 52, 54 into latches 55, 57 for the separate Ports A and B. There is an input table look-up function as the data 59, 60 enters the table. Each pixel is transformed by a 256×8 RAM 61, 63. The RAM table may be loaded by means of control lines 58. The result is latched and then read out sequentially. The contents of the table look-up function depend on the specific neural network or transformation implemented. If the neural network was simulating a retina (in a manner similar to the analog chips that Carver Head has produced, which are described in the article by Carver Mead and M. A. Mahowald entitled "A Silicon Model of Early Visual Processing", published in *Neural Networks*, vol. 1, pp. 91–97 (1988)), then the function could be a logarithm.

Referring now to FIG. 9, there is shown the pixel output block diagram including several functional units such as the arithmetic systolic array 65 hierarchical bus unit, the data transformation unit 67, an event monitor 69, and the output unit 71. In FIG. 9, the ASAOUT 65 receives the results from the arithmetic array processor at a peak of one per cycle and an average rate that depends on the size of each neural network layer or convolution window, but is no greater than half the input rate. As the window size increases above the systolic array size (e.g. eight), the output bandwidth becomes a small percentage of the input bandwidth.

With reference to FIG. 3, ASAOUT 31 receives inputs from each ASA cell through a hierarchical bus structure under control of the chip controller 42. As each processing element completes a result, it is enabled and read through a dual bus structure in a single cycle. This hierarchical bus allows up to 64 processing elements in the systolic array 25 to bus together, reducing 'real estate' requirements on integrated circuit chips by avoiding wide 28-bit registers for each accumulator. Eight additional tri-state buffers 29 are required to provide this two-level bus multiplexing.

The data transformation unit contains a barrel shifter 68 to normalize the data. The results can accumulate up to a maximum of 28-bits depending on window size, and are normalized by a barrel shifter that can shift anywhere from 0 to 28 bits in a single cycle.

This feeds a RAM based 256×8 table lookup (TLU) 67 to perform a sigmoid function, for example. The normalized data drives the TLU's address, giving the final result. The TLU can be loaded by the chip controller from external memory (not shown). The capability is also provided to bypass 73 the TLU in the event the transformation is unity.

An event monitor 69 is provided to monitor events at the output of the TLU. When a programmed event is detected, the event monitor signals the chip controller than an event is detected. The chip controller then interacts with an external processor through control lines to indicate that an event occurred.

The output interface 71 to the pixel bus is similar to the pixel input interface. The TLU drives four double-buffered 8-bit registers 75, 77. Double-buffering is required to allow for overlapping the pixel memory write operation with the TLU store.

In a cooperative-competitive neural network mode, the systolic array performs a convolution with a connection window where the on-center weight is positive and the off-surround weights are negative. The table look-up functions perform the non-linear thresholding function required for the competitive interaction. A completely general, cooperative, competitive interaction can be performed in this manner with the cooperative connections having positive weights and the competitive connections having negative weights.

The advantages of the systolic array according to the present invention include the ability to compute convolutions of arbitrary size in the systolic array, limited only by the size of the external memory and the size of the accumulator bus 19 in FIG. 2. The 28-bit ASAOUT bus given in the image processing example with 8-bit by 8-bit multipliers 15 limits the kernel size to 64×64 if arithmetic overflows are not allowed. These numbers are exemplary only and are merely dependent on the present technology used to implement the invention. Another advantage is that no large delay lines are required for the data or the weights, as are required in prior systolic array architectures used for convolution. Further, the systolic array is very efficient for convolutions of arbitrary kernel size. It can process the complete two-dimensional array of data in one pass for kernel sizes less than or equal to the size of the processing element array. For kernel sizes, L×L, that are larger than the systolic array size, N×N, the number of passes through the data is given by:

$$K = \frac{L^2}{N^2}, \tag{8}$$

which is the result given previously in equation (3).

This value, K, is the smallest number possible in any systolic array with a limited number of multipliers 15. This is based on the total number of multiply-accumulate cycles required to do $M^2$ convolutions for an array of M×M data points. The number of cycles required (neglecting edge effects) is given by:

$$T = L^2 M^2. \tag{9}$$

If all the $N^2$ multipliers are working at 100% efficiency, then the number of cycles per multiplier is:

$$\frac{T}{N^2} = \frac{L^2 M^2}{N^2} \quad (10)$$

This number is the minimum time, in cycles, that the array can perform the convolution. If a single data point is read per array cycle, then $M^2$ is the number of cycles for a complete pass of the image through the systolic array. Thus the ratio of the minimum time required to the number of cycles per pass is given by:

$$K = \frac{T}{M^2 N^2} = \frac{L^2}{N^2}, \quad (11)$$

in accordance with the present invention as an optimum systolic architecture. In addition, the outputs of a fully-connected, feedforward neural network, such as backpropagation, can be computed by this systolic array with no change in architecture. Furthermore, the outputs of a cooperative-competitive layer of a neural network can be computed by this systolic array with no change in architecture.

The present systolic array requires that two data values be read for each clock cycle. The required access time for the external memory can be reduced by reading the data in words of 32 bits that represent 4 data values of 8 bits each. In this manner, a fast VLSI systolic array can interface to relatively slow memory and external hardware.

In another embodiment of the present invention, a variable-length delay line can be connected to the A input of FIG. 1 to provide the data required for the B input. This would eliminate the requirement to read the external memory twice for each systolic array cycle. The delay line could be implemented on the chip, and the length of the delay line is a product of the number of columns of the image and the number of rows of the kernel. However, this same configuration would inhibit being able to efficiently implement convolutions with kernels and images of arbitrary size.

In another embodiment of the present invention, a set of variable length recirculating delay lines could be used to store the weights instead of the external weight memory shown in FIG. 4. These delay lines are small (size L for a kernel of size L×L) and could be implemented on the chip to eliminate the need for an external weight interface. However, this same configuration would inhibit being able to efficiently implement a fully-connected, feedforward neural network in that the size of the fully-connected neural network would then be limited by the length of the delay lines, and the speed would be limited by the rate at which the weight values could be modified or injected into the delay lines.

Figure 10:
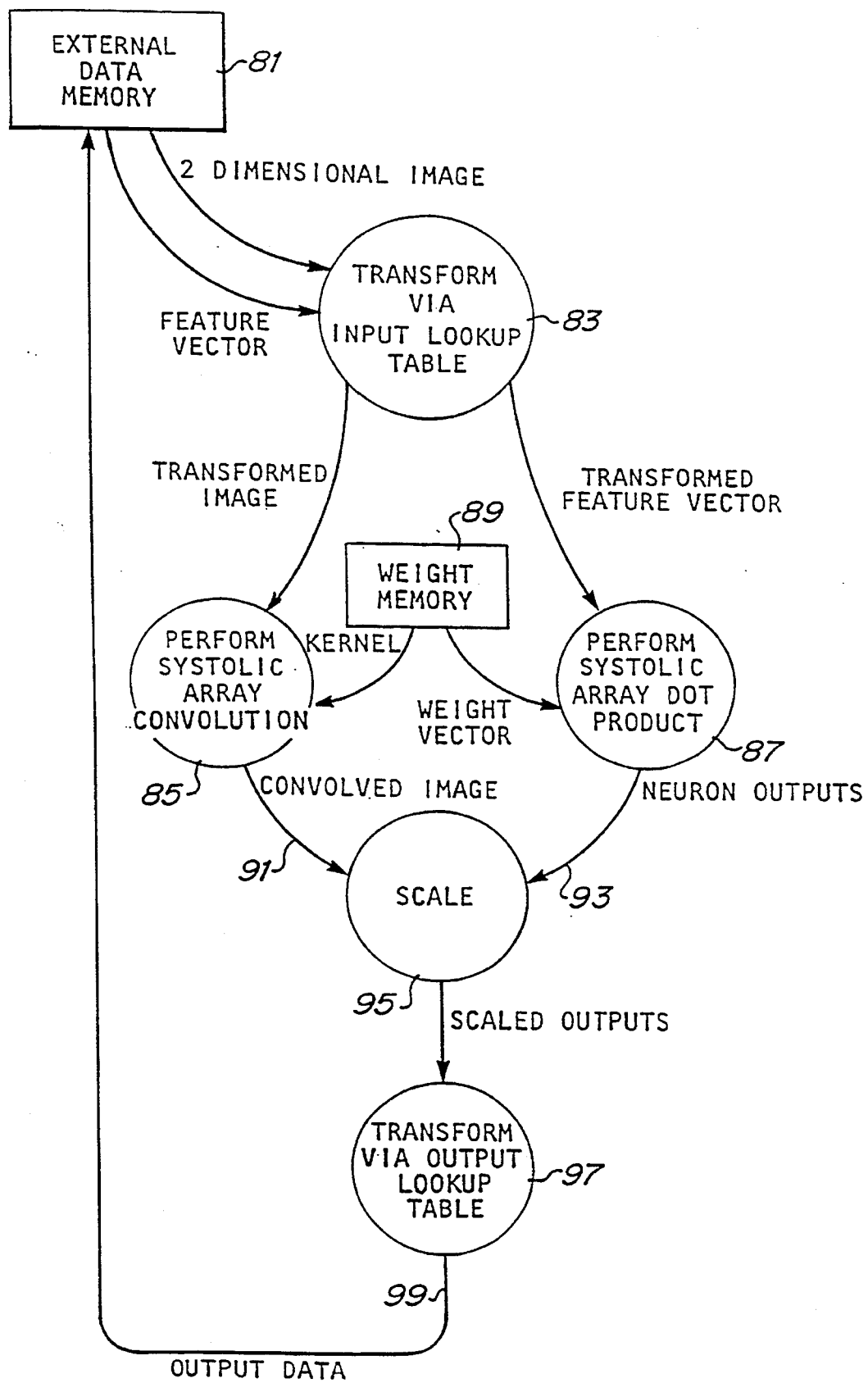
FIG. 10 is a flow chart illustrating data flow in operation according to the present invention.

FIG. 10 is a high-level data flow diagram that illustrates the operation of the present invention. Both convolution and feedforward neural network operations are illustrated. Control signals and flow are not shown, only the data as it flows between major portions of the system.

Either a two-dimensional image or a feature vector flows from external data memory 81 to the look-up table process 83. There, data is transformed by the function stored in the table and flows out to the systolic array 85, 87. The systolic array is configured either to perform a convolution 85 on the transformed image with a kernel that is stored in the weight memory, or to perform a series of dot products 87 on weight vectors stored in the external weight memory 89. After passing through the systolic array, the convoluted image 91 or the neuron outputs 93 are scaled 95, then transformed, by the output table lookup 97. The outputs 99 of the look-up table are then stored in external memory 81.

Two distinct flow paths 81, 83, 85, 95, 97 and 81, 83, 87, 95, 97 are shown for two modes (convolutional mode and fully-connected neural network mode) of the systolic array. The cooperative-competitive neural network mode was not illustrated in the data flow diagram because it operates in a manner identical to the convolutional mode as it pertains to the chip. The data, however, in the cooperative-competitive mode, is re-circulated in a relaxation process that was explained in the previous section. The external re-circulation is under the control of an external microprocessor or host computer.

Figure 11:
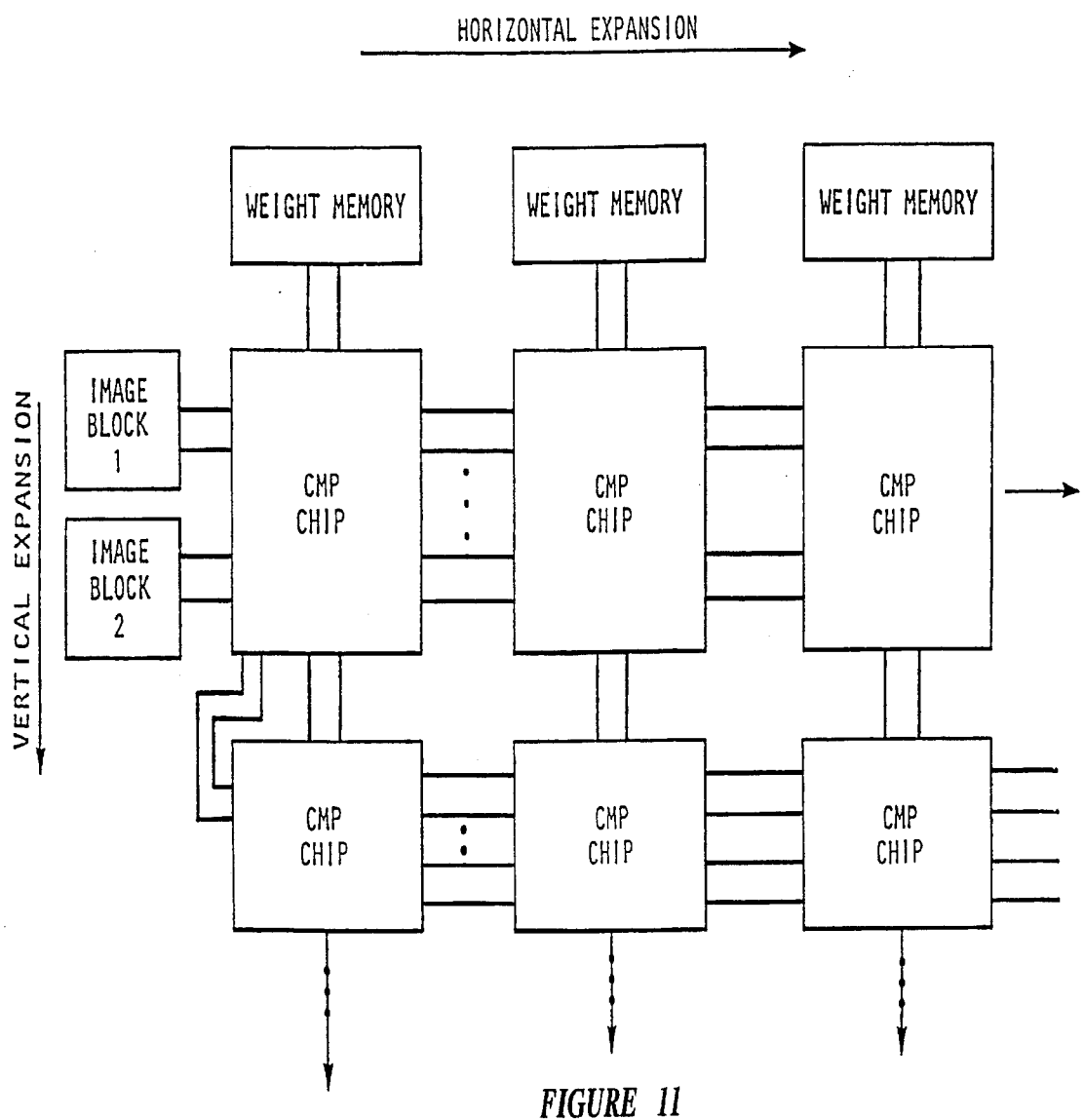
FIG. 11 is a block schematic diagram illustrating an expanded network of additional chips and additional weight memories.

The systolic array has been configured to be incrementally expandable by providing the capability of utilizing additional array chips in both horizontal and vertical directions. The block schematic diagram of FIG. 11 depicts one form of expansion by the use of six additional CMP chips and two additional weight memories.

Expanding horizontally provides for the simultaneous calculation of additional pixel convolutions while also providing the added feature of tripling the number of interconnects per second for fully connected feed-forward neural networks. This effectively triples the performance of the system for a given image frame size. Expanding horizontally requires the addition of external weight buffers to feed data in data bus 21. Additional input signals would be added to allow for the passing of data bus 19 to be transmitted to the next horizontal CMP chip's bus 20, bypassing the input multiplexors.

Expanding vertically provides a two-fold convolutional performance increase with no additional fully connected feed-forward performance increase. There is no need for additional weight buffers for the vertical expansion. For this first CMP node column, the B bus and the final M3 multiplexor output would be passed to the next vertically positioned CMP node, eliminating the need for additional pixel memory blocks.

The modular characteristics of the systolic array according to the present invention greatly facilitates tailoring the architecture of the array to the particular application.

Alternative Architectures

Figure 12:
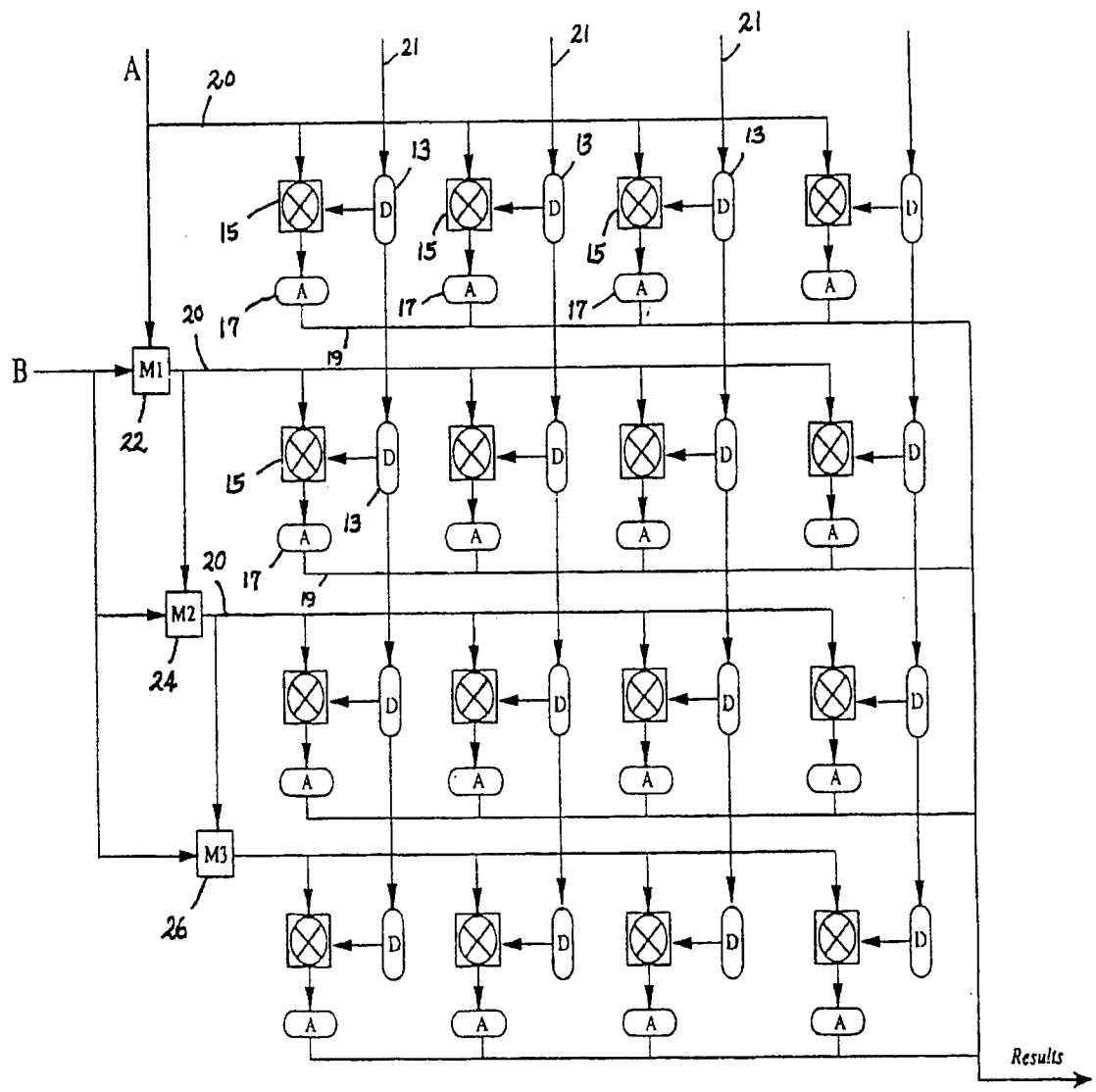
FIG. 12 is a block schematic diagram of another systolic array according to an alternative embodiment of the present invention.

An alternative version of the systolic array architecture of the invention is shown in FIG. 12. This array differs from that shown in FIG. 1 in that the pixel data registers 11 of FIG. 1 are not present in FIG. 12. Thus, the pixel data values for each row of the processing element array are simultaneously broadcast to all processing elements on that row. The other electronic features of this version are similar to the electronic features of the system of FIG. 1. FIG. 12 shows a 4×4 array of processing elements 15. This array can be expanded to any size, as discussed previously.

The image convolution operation of the alternative version of FIG. 12 will be described by first considering an example. We define the input image as a set of pixels in an array of M rows and N columns. These pixels are labelled sequentially as p[i], where i ranges from zero to NM-1. The labelling sequence follows a raster-type pattern, starting with p[0] in the upper left hand corner of the image and ending with p[NM-1] in the lower right hand corner of the image. This pattern is illustrated in FIG. 13. This Figure may be compared with FIG. 5C which defines the notation for the image pixel array in the description of the first version of the invention. From this comparison we can identify: p[0]=p(1, 1), p[1]=p(1,2), . . . p[ N]=p(1,N), p[N+1]=p(2,1), . . . p[NM-1]=p(M, N).

The kernel weights are labelled in a similar manner, and are denoted by w[i]. For example, we consider a 4×4 convolution, and label the 4×4 kernel array according to the diagram in FIG. 14. The labelling sequence follows the same pattern, with w[0] in the upper left hand corner and w[15] in the lower right hand corner. Comparing again with FIG. 5C, we see that w[0]=k(1,1), . . . w[3]=k(1,4), w[4]=k(2,1), . . . w[15]=k(4,4).

We also label the processing elements PE[i] and the resulting array from the convolution y[i] in a similar pattern. These arrays are illustrated in FIGS. 15 and 16, respectively. Comparing FIG. 15 with FIG. 5C, we have PE[0]=PE(1,1), . . . PE[3]=PE(1,4), PE[4]=PE(2,1), . . . PE[15]=PE(4,4). Analogously the output array notation is related to the previous designations in Equations (1), (2) by: y[0]=O(1,1), y[1]=O(1,2), . . . y[N]=O(1,N), y[N+1]=O(2,1), . . . y[NM-1]=O(M,N).

Pixels enter the systolic array on the inputs A and B as shown in FIG. 12. The multiplexors, M1, M2, M3, mix the two inputs in a manner to be described in the following. The pixel values, as output by the multiplexors, are broadcast along each row of processing elements. The weights flow systolically from processing element to processing element down the columns. The results stay in the processing element and accumulate the terms of the convolution.

The external weight RAM 33 is organized into four separate banks, one for each column of the systolic array. The weight values are stored sequentially in memory as illustrated in FIG. 17. An address generator continuously reads the addresses 0, 1, . . . 15 during the systolic array's operation. There is also a flag bit associated with the first weight in the kernel, w[0], that signals the accumulator to output its value and to clear. This resets the accumulator and begins the cycle of accumulation.

The kernel weights from the first bank are sequentially read into the processing element PE[O] through the kernel data input channel 21. At each clock cycle time step one of these weight values is read. The sequence of values read in the PE[O], as shown by FIG. 17, is: w[0], w[1], w[2], . . . w[15]. The next value read is w[0], and the cycle is relocated.

The kernel weights shown in the other 3 columns of FIG. 17 are read into the processing elements PE[1], PE[2], PE[3] through the channel 21 in the same manner. Thus the initial value read into PE[1] is w[12], then w[13], w[14], w[15], w[0], . . . etc. The initial weight value in PE[2] is w[8], and the initial value in PE[3] is w[4].

Figure 18:
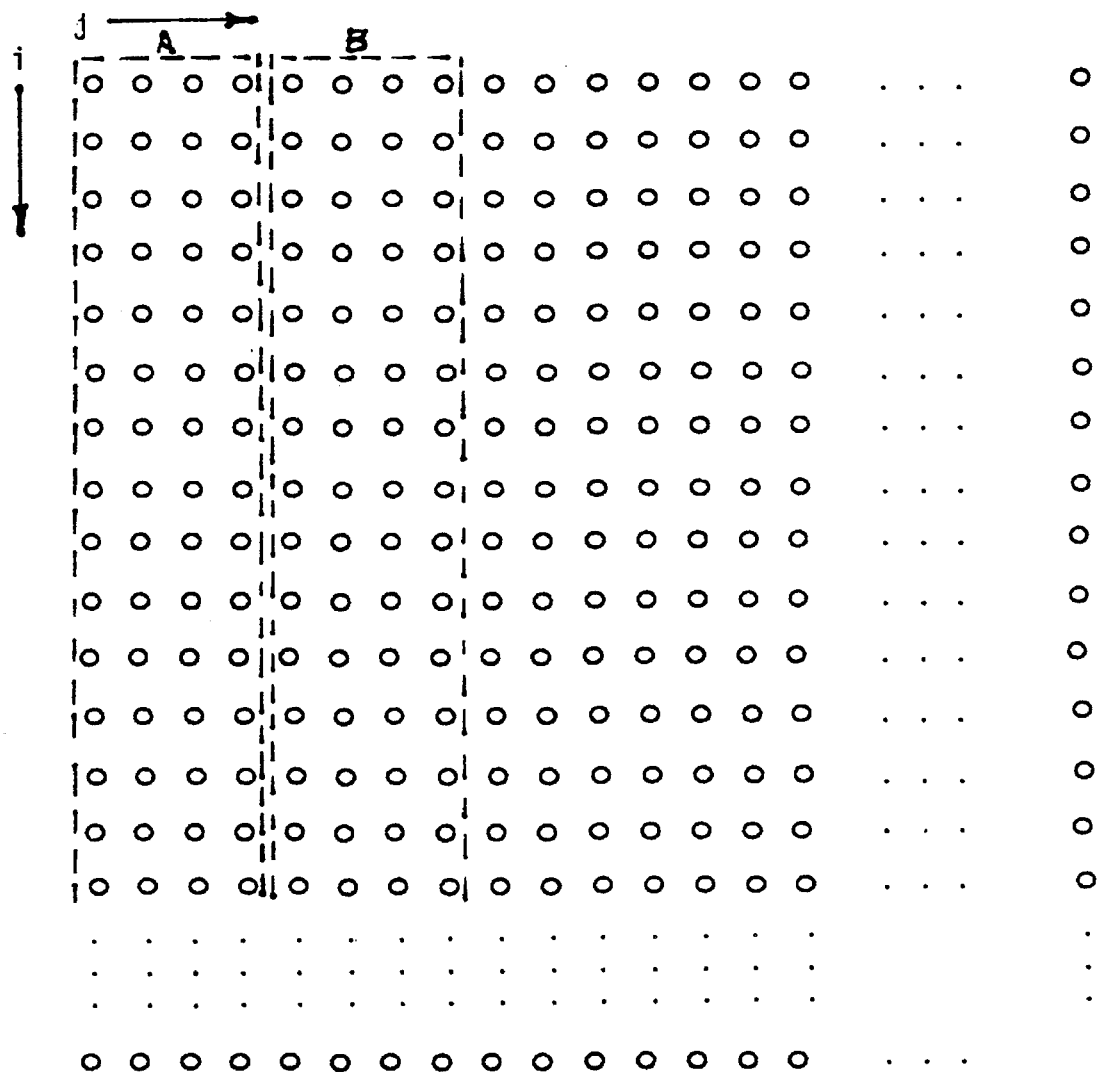
FIG. 18 is a diagram of the scanning patterns of port A and port B for the pixel array of FIG. 13 according to the alternative embodiment of FIG. 12.

The pixels are assumed to be stored in a bank of external RAM in the manner shown in FIG. 13. The image pixels are read out of the RAM from the columns of four pixels illustrated in FIG. 18. Each of these sets of four columns is read sequentially in a raster scan from left to right and from top to bottom. The image data is thus read simultaneously into input ports A and B. As discussed previously, the timing and address control of these read operations is programmable, so that the B port begins reading data at a different address and time from the A port, and the difference can be specified and adjusted by the user. In the present example, the first four pixels in each row are read out sequentially and placed in the A input of FIG. 12. The second four pixels in each row are read out simultaneously and placed on the B input of FIG. 12. A fixed length delay is programmed into the path of the B input relative to the A input, so that the pixel values properly align with the action of the multiplexors. The timing of the multiplexor action and the delay required in the B path is calculated by analyzing the processing in each PE.

Figure 20:
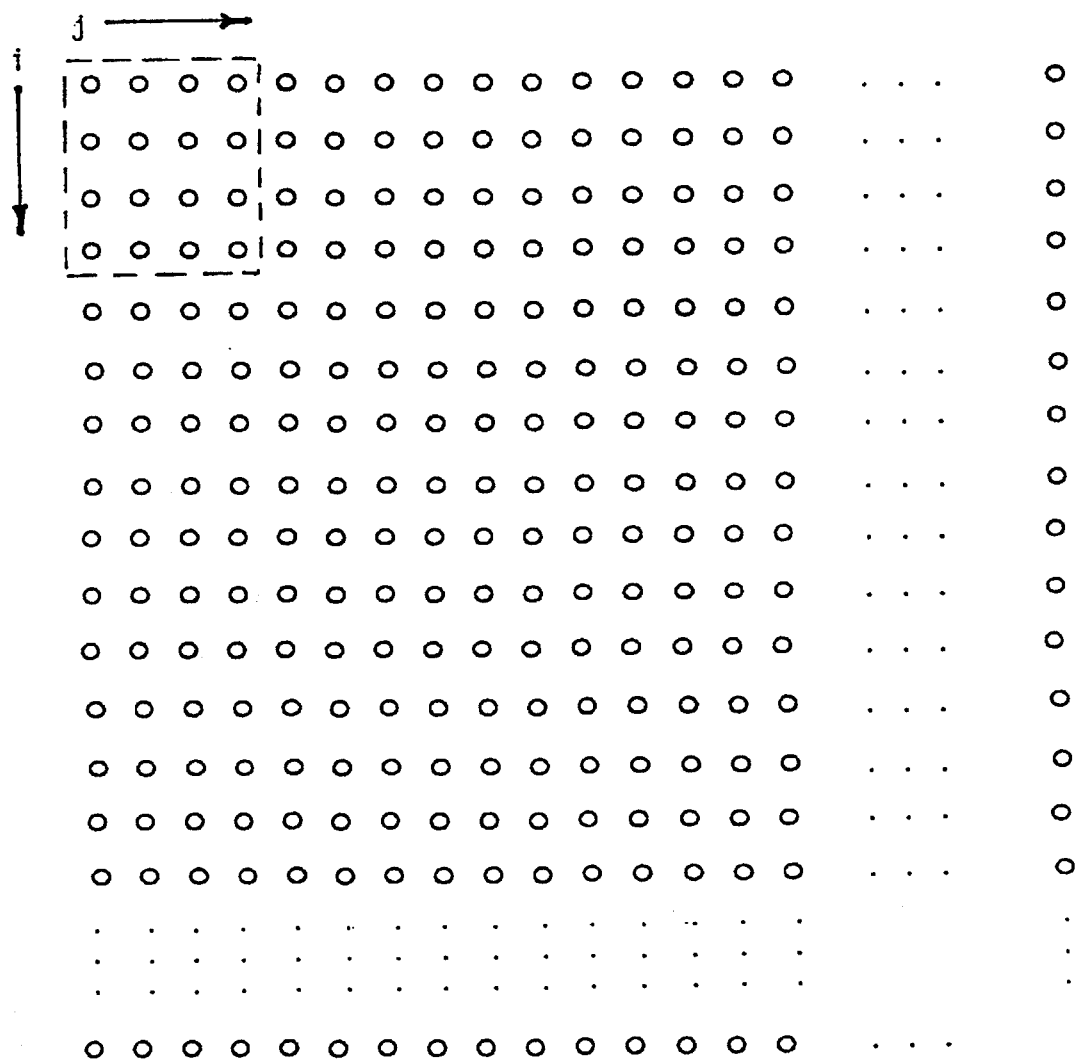
FIG. 20 is a diagram of the image pixel array of FIG. 13, showing the pixels that are convoluted to produce the output array element y[0] of FIG. 16, where each circle represents a pixel.
Figure 21:
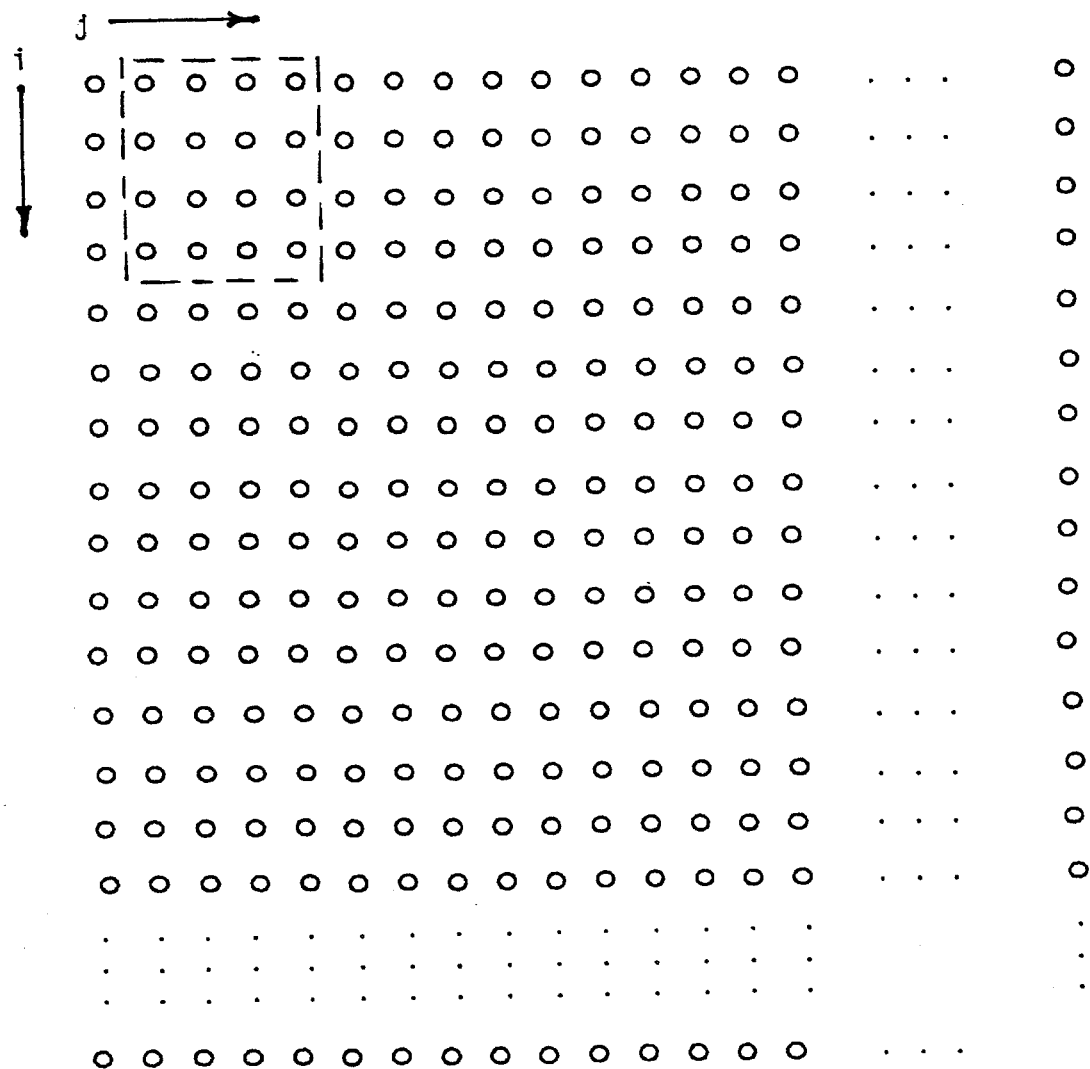
FIG. 21 is a diagram of the image pixel array of FIG. 13, showing the pixels that are convoluted to produce the output array element y[1] of FIG. 16, where each circle represents a pixel.
Figure 23:
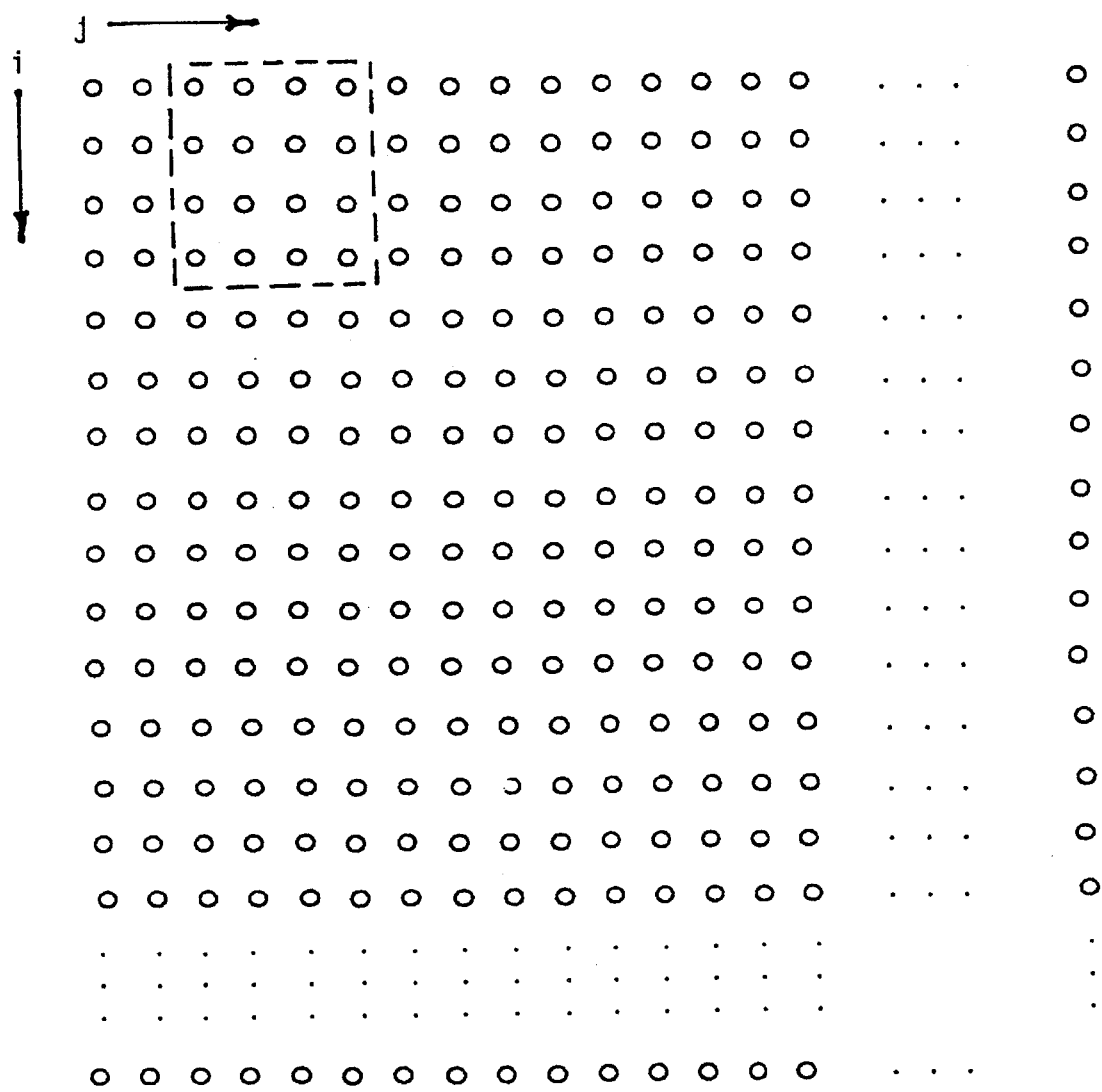
FIG. 23 is a diagram of the image pixel array of FIG. 13, showing the pixels that are convoluted to produce the output array element y [2] of FIG. 16, where each circle represents a pixel.
Figure 24:
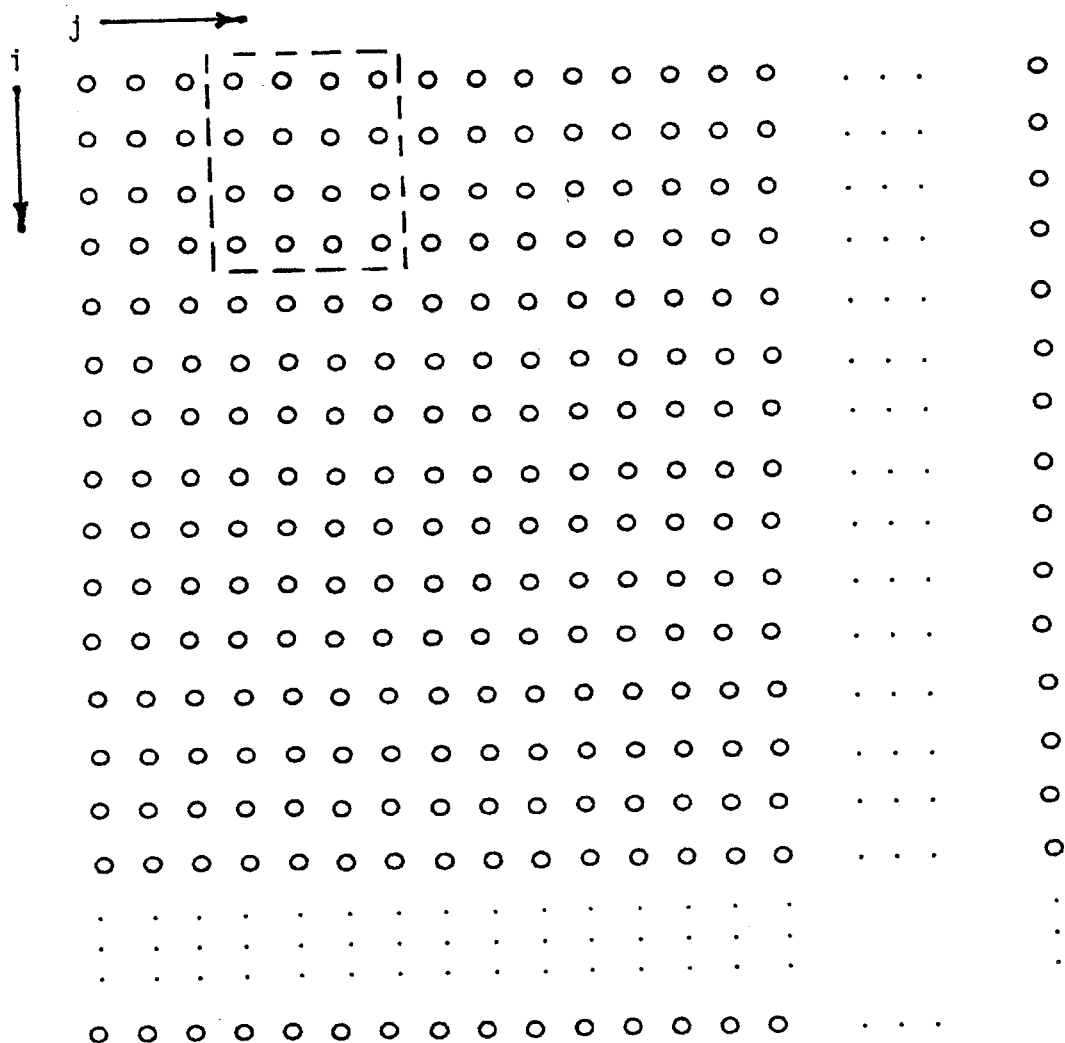
FIG. 24 is a diagram of the image pixel array of FIG. 13, showing the pixels that are convoluted to produce the output array element y[3] of FIG. 16, where each circle represents a pixel.

FIG. 19 gives the time history of the pixel values and weight values for PE[0]. PE[0] computes and outputs the first convolution result, y[0], correctly at time step 16. This is seen schematically in the diagram of the image pixel array in FIG. 20, where the dotted lines enclose a region representing an overlay of the kernel on top of the image to produce the result y[0]; i.e. the first convolution result comes from overlaying the kernel onto the image's upper left hand corner. The output of PE[4] gives the second convolution result in the next time step. The output value is identical to that obtained by shifting the kernel overlay by one pixel to the right as illustrated by the region enclosed by dotted lines in the image pixel array diagram of FIG. 21. If the multiplexor, M1, were continuously connected to the source, A, FIG. 22 shows a list of the pixel values and weights that would arrive at PE[4] (under the heading: M1=A continuously). The desired pixel values are also listed in a separate column. The latter values are required in order to compute the convolution result correctly in PE[4]. It can be seen that the pixel values that show up at PE[4] (when M1=A continuously) differ from the values required only at the time values 4, 8, 12 and 16, i.e., every fourth time step. Instead, the multiplexor switches to the source B every fourth time step, and the pixels at source B are shown in the fifth column of FIG. 22. With these pixels present, the processing element PE[4] correctly computes the required convolution result. By continuing the analysis of the requirements at processing elements PE[8] and PE[12], it is seen that:

1) the pixels required by processing element PE[8] are those enclosed by the dotted lines in the pixel array diagram of FIG. 23, and are obtained by connecting multiplexor M2 to source B at time steps 5, 9, 13 and 17, as indicated in column 6 of FIG. 22; and 2) the pixels required by processing element PE[12] are those enclosed by the dotted lines in the pixel array diagram of FIG. 24, and are obtained by connecting multiplexor M3 to source B at time steps 6, 10, 14 and 18, as indicated in column 7 of FIG. 22.

Figure 25:
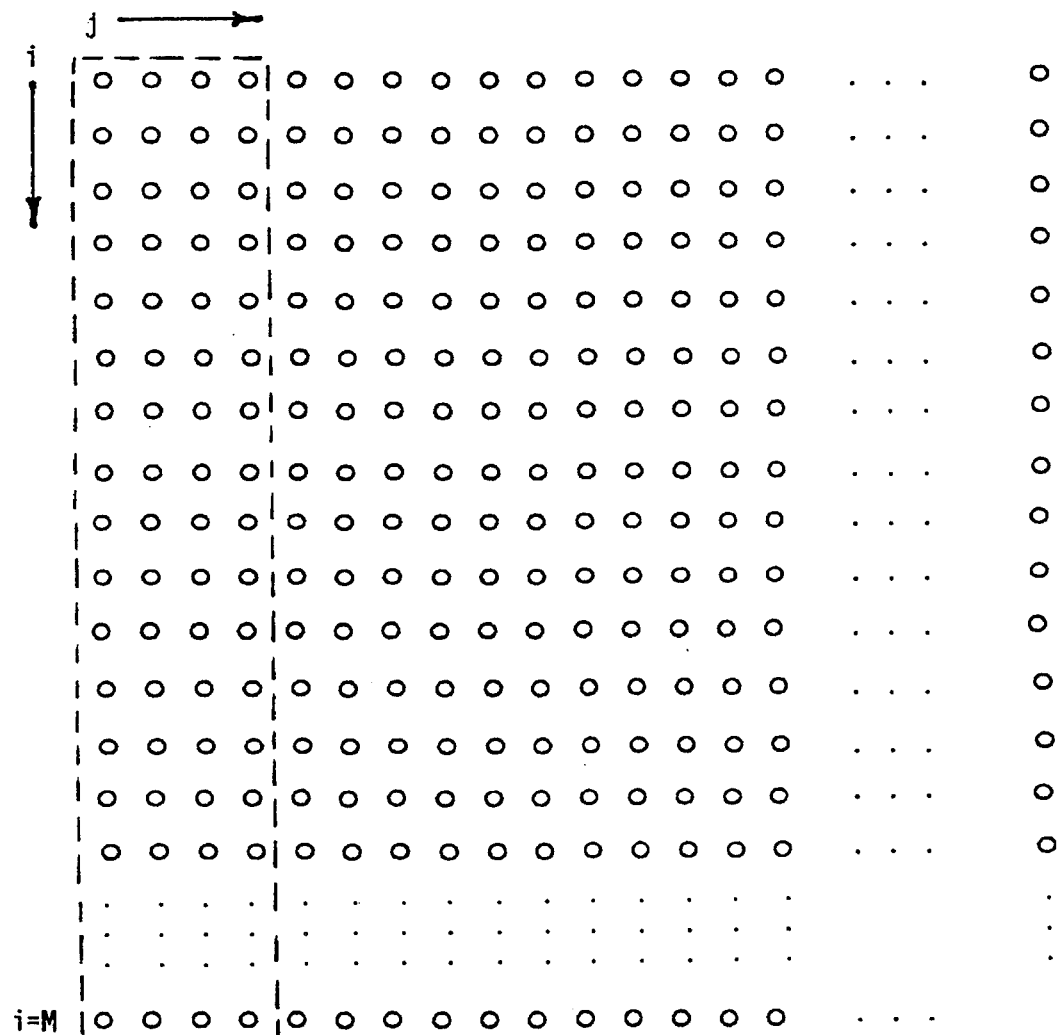
FIG. 25 is a diagram of the image pixel array of FIG. 13, showing the region scanned by the source data channel A for the first 4M pixels, where each circle represents a pixel.
Figure 26:
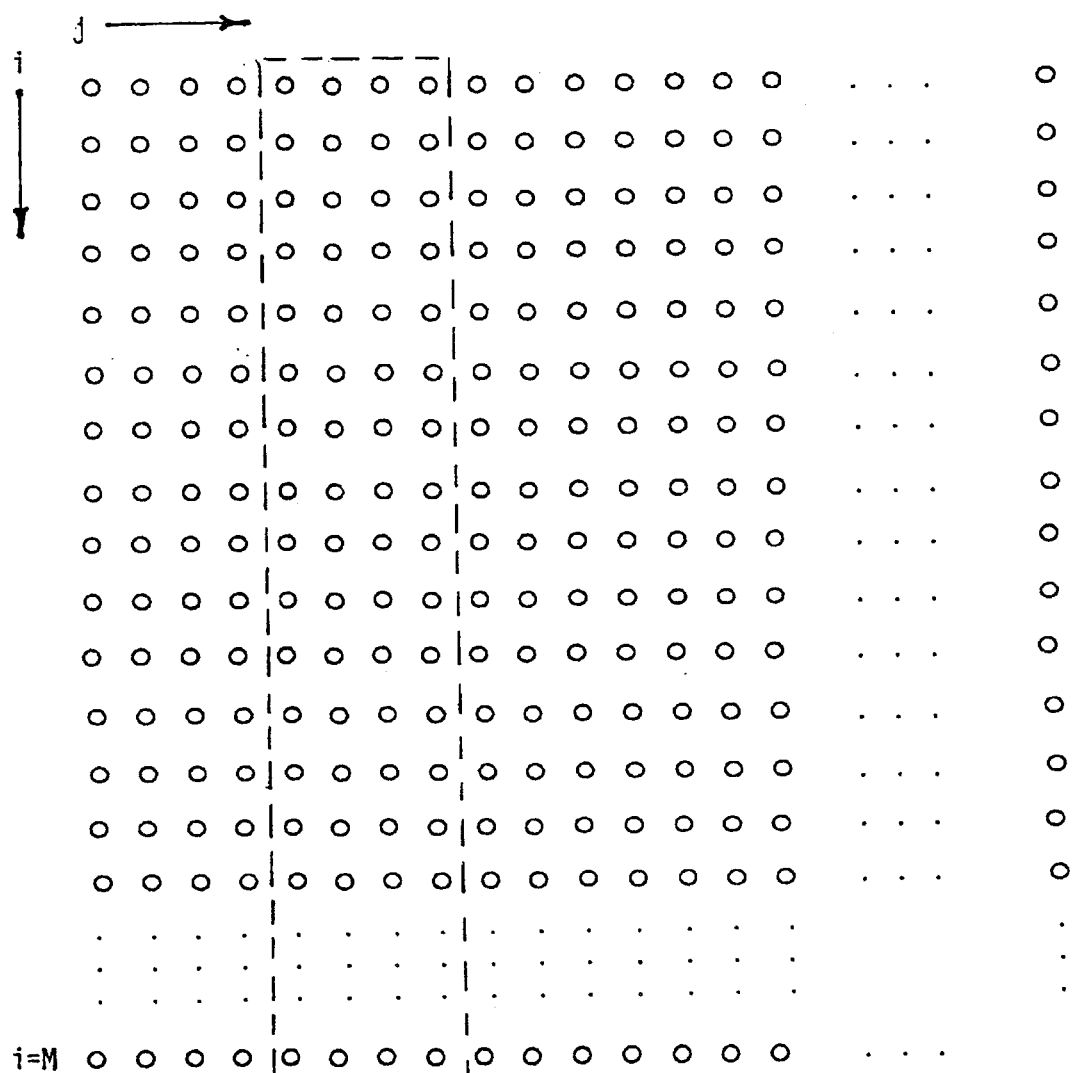
FIG. 26 is a diagram of the image pixel array of FIG. 13, showing the region scanned by the source data channel B for the first 4M pixels, where each circle represents a pixel.
Figure 27:
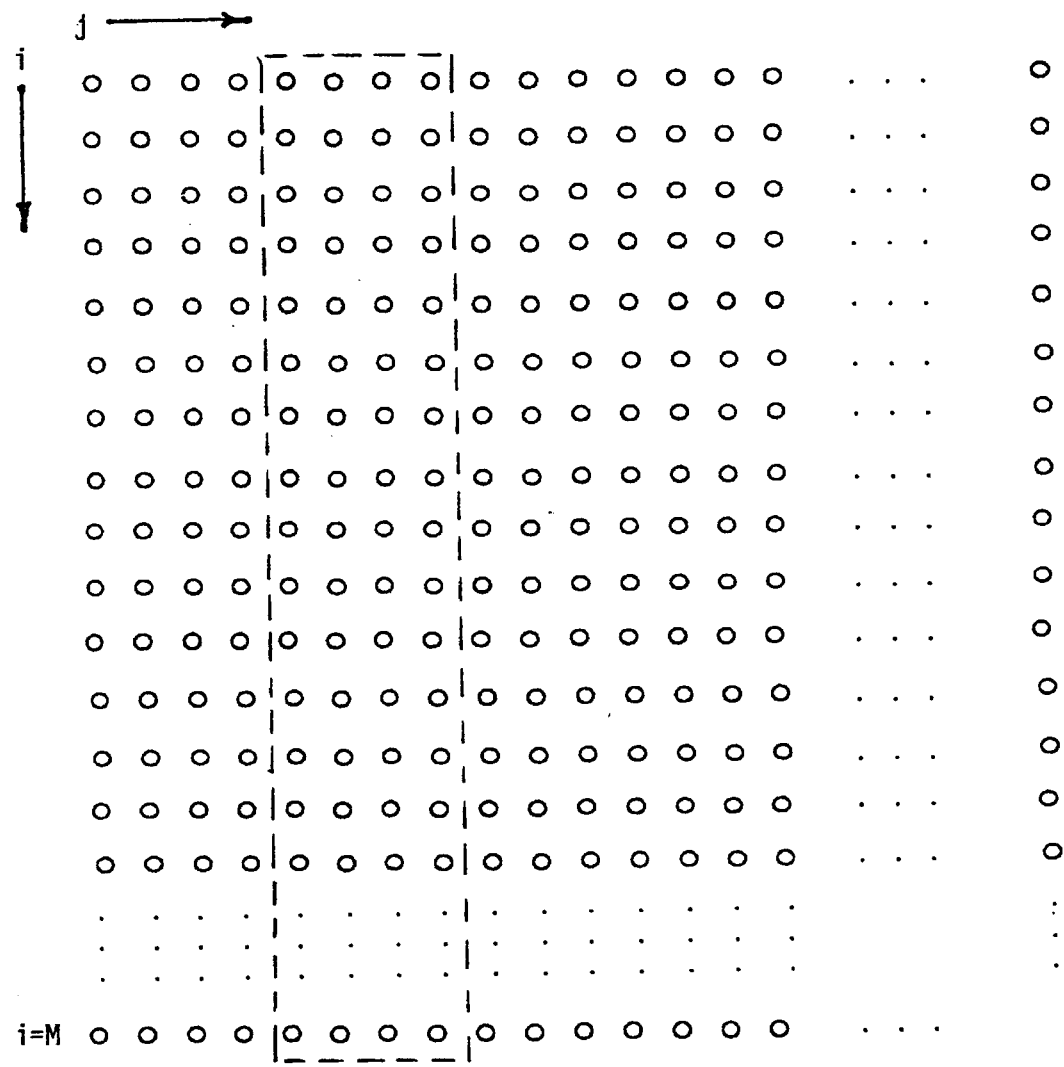
FIG. 27 is a diagram of the image pixel array of FIG. 13, showing the region scanned by the source data channel A for the second 4M pixels, where each circle represents a pixel.
Figure 28:
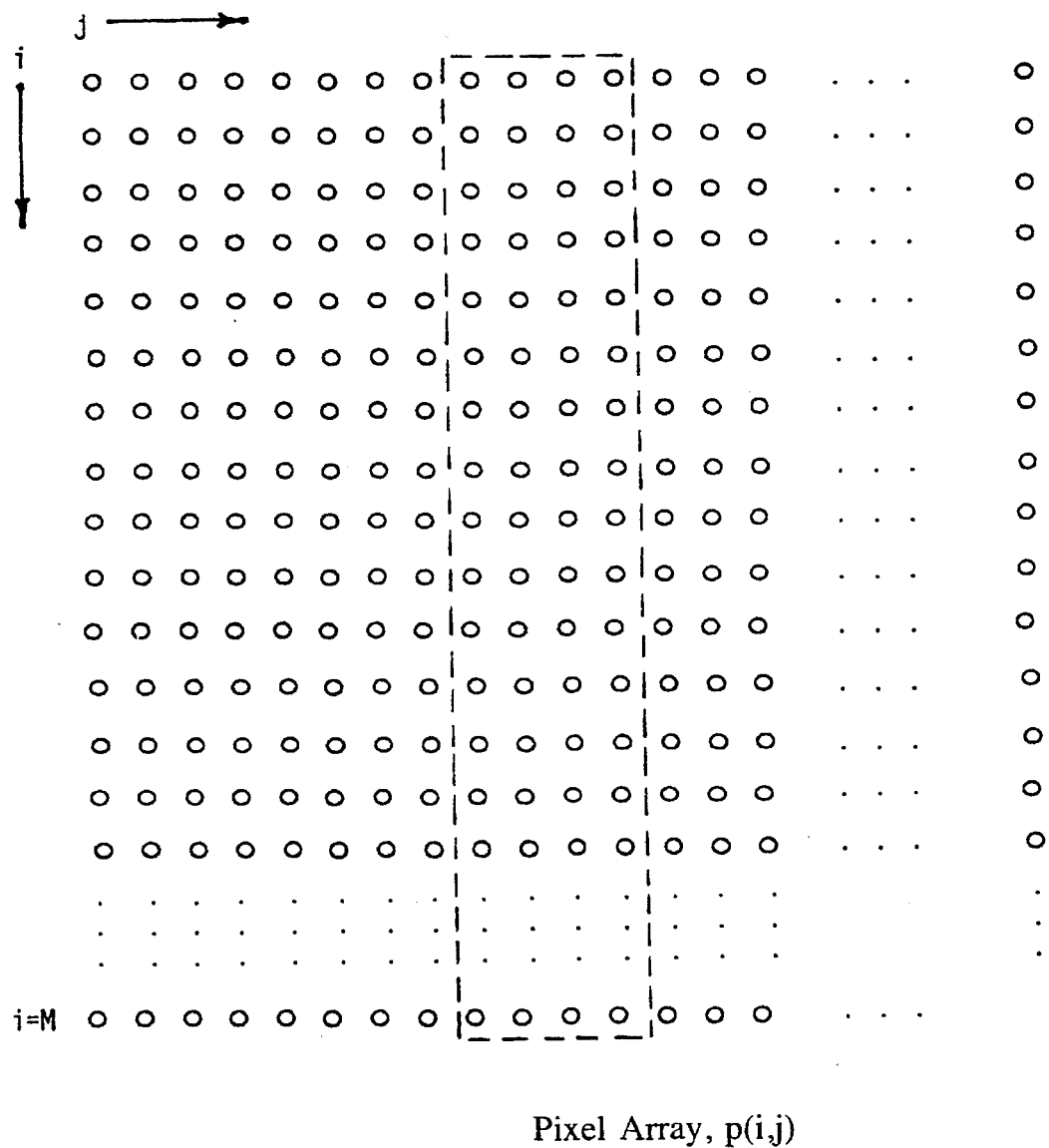
FIG. 28 is a diagram of the image pixel array of FIG. 13, showing the region scanned by the source data channel B for the second 4M pixels, where each circle represents a pixel.

By examining the pixels required to be at sources A and B, we see that there is a time delay required before the start of the B scan activity and that the pixels required are just those called for earlier. Pixel array diagrams showing the initial scan regions for port A and port B are shown in FIGS. 25 and 26, respectively. FIGS. 27 and 28 are pixel array diagrams showing the continuation of the A and B scan regions. As these Figures indicate, when the bottom of the image column of four pixels is reached, the scan continues with the next set of 4 pixels at the top of the next column. The time delay that has been shown to be required for the B scan relative to the A scan can be inserted by a fixed delay placed in the path of source B.

Figure 30:
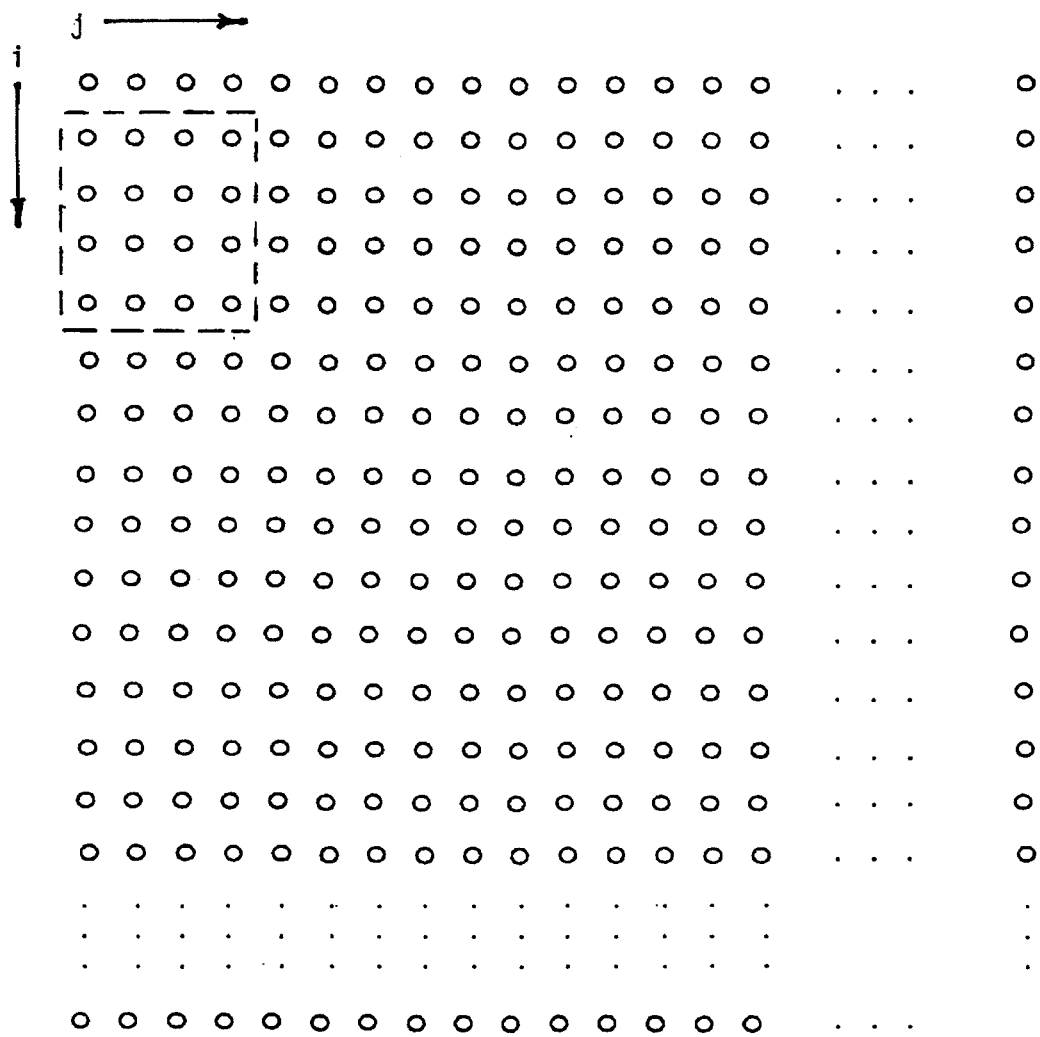
FIG. 30 is a diagram of the image pixel array of FIG. 13, showing the pixels that are convoluted to produce the output array element y[N] of FIG. 16, where each circle represents a pixel.

The foregoing discussion shows that the processing elements PE[0], PE[4], PE[8], and PE[12] output the convolution results y[0], y[1], y[2] and y[3] at times 16, 17, 18 and 19. FIG. 29 shows the data and weights arriving at PE[1] for the first 21 clock cycle time values. This diagram indicates that PE[1] computes and outputs the convolution output y[N] at time 20. FIG. 30 is a pixel array diagram in which the dotted lines indicate the region used to calculate this value y[N]. The remaining processing elements of the systolic array have pixel data and weights arriving correctly so as to compute and output the convolution results in the same sequence as the pixels are read from RAM by the A scan.

After a time delay of 16 clock cycles the results begin to emerge from the systolic array.

Figure 31:
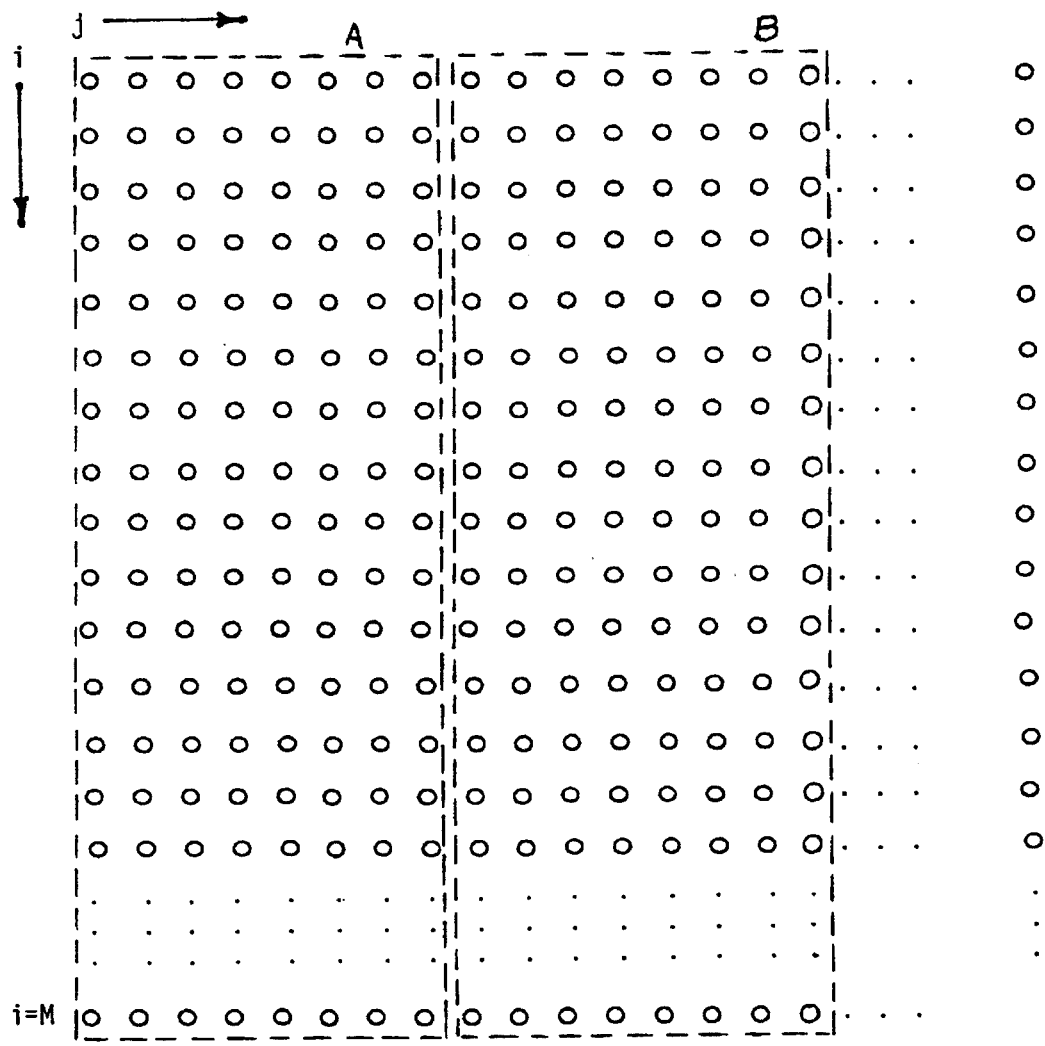
FIG. 31 is a diagram of the image pixel array of FIG. 13, showing the regions scanned by the source data channels A and B for the first 8M pixels in an 8×8 convolution, where each circle represents a pixel.

The preceding description of the operation of the alternative systolic array architecture illustrates as an example a 4×4 convolution of an image in a 4×4 processing element array. However, this architecture allows the system to generate convolutions with kernels that are larger than 4×4 within this same size array. This can be done simply by reprogramming the data source channels and the multiplexors. For the 4×4 convolution considered above, each multiplexor chooses pixel data from the B source channel once every four clock cycles. The other three out of every four clock cycles it looks to the previous row as the source. If, for example, we use this 4×4 array to carry out an 8×8 convolution, then the multiplexors must be reprogrammed to look at the B source channel only one out of every eight clock cycles. The data source channel A must furthermore be reprogrammed to scan the first 8 columns of the image pixel array, and the source channel B must be reprogrammed to scan the second 8 columns of the pixel array. These scan regions for an 8×8 convolution are shown in FIG. 31, which is a diagram of the image pixel array in which the scan regions are enclosed by dotted lines.

The kernel for an 8×8 convolution is stored in the external weight RAM in the manner shown in FIG. 32. The kernel weights are stored in four banks of memory and read into the processing elements in the first row of the PE array. This organization of kernel weights in separate banks may be implemented by storage of all the kernel data in four separate locations in memory. Alternatively, this organization may be purely symbolic, that is, the kernel weights may be stored in only one physical region and the bank organization may be implemented by programming the addresses of locations in this region that are read into each column of the processing element array.

Figure 33:
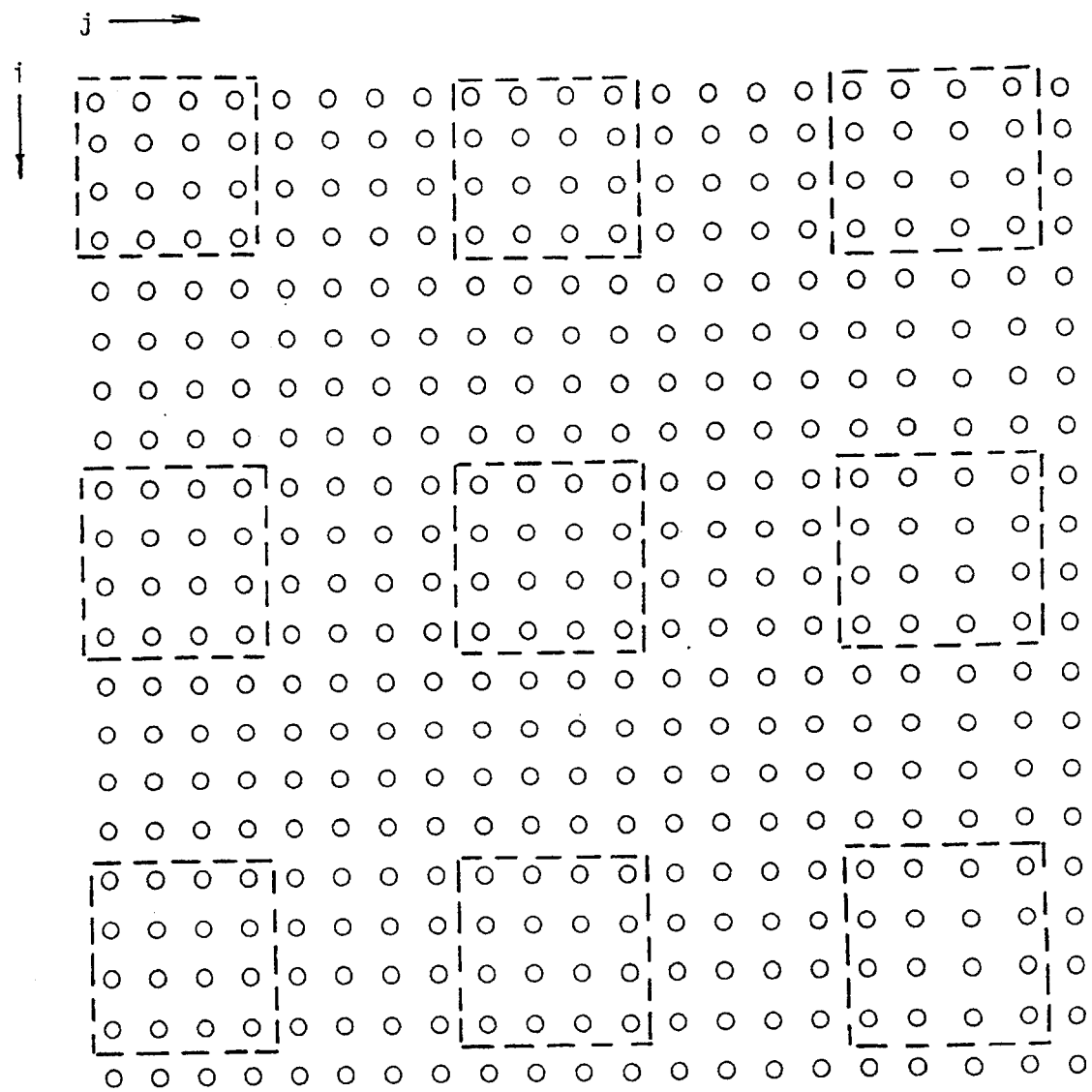
FIG. 33 is a diagram of the array resulting from the 8×8 convolution of the image pixels of FIG. 32, showing the values that are calculated on the first scan of the entire image, where each circle represents an element of the output array.

When the image is passed through the systolic array the first time, the array calculates the results as shown in FIG. 33. This Figure indicates the elements of the output array that are computed on the first pass by the regions enclosed by dotted lines. The 4×4 systolic array can be multiplying and accumulating on only sixteen results at the same time, since it has only sixteen processing elements. Sixteen results are output every 64 clock cycles. The image passes through the systolic array three more times to fill in the missing blocks in FIG. 33. The kernel weights in FIG. 32 are delayed by eight clock cycles in each row as opposed to a four clock cycle delay shown in FIG. 17, which listed the contents of the weight RAM for a 4×4 convolution.

The foregoing two examples illustrate how a 4×4 and an 8×8 convolution are calculated in this version. The convolution of larger kernels is performed in a similar manner. The upper limit of the kernel size is governed by the number of bits in the accumulator in each processing element. As discussed previously, increasing the size of the kernel for a given array increases the number of scans of the image array required to complete the entire convolution computation. In general, for a convolution of size L×L, each of the multiplexors selects pixel data from the B source once every L clock cycles. The A source scans the first L columns of the pixel data array in the usual row-by-row raster pattern, then continues scanning the second L columns, and so on. The B source scans the second L columns of the pixel data array in the same raster pattern, and then continues scanning the 3rd, 4th, ... L-column blocks in the same pattern. The B source scan commences L cycles after the beginning of the A source scan. This relative delay is maintained throughout the scans. When each scan has covered the entire image, it returns to the first pixel and repeats the scan.

For an L×L convolution, the first column of the systolic array is sequentially loaded with kernel weight values in the usual order, commencing with w[0]. This order is defined by the raster scan of the kernel array from w[0] to w[$L^2$-1]. The second column of the systolic array is sequentially loaded with kernel values in the same order, commencing with w[$L^2$-L]. The third column similarly commences with w[$L^2$-2L] and the fourth column commences with w[$L^2$-3L]. Each of these scans of kernel weight values proceeds through the normal sequence, and after the value w[$L^2$-1] is reached, the next value loaded is w[0] and the scan cycle is repeated. The value w[0] always carries the control bit that empties and resets the accumulator.

Figure 34:
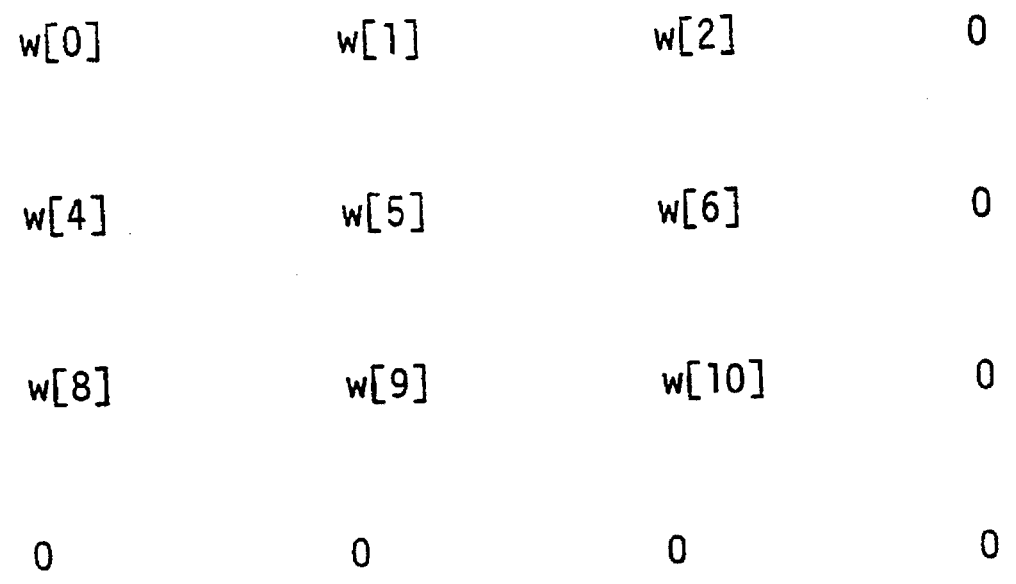

If the convolution kernel size is smaller than the physical array size, then the kernel is expanded and filled with zeros until the size reaches a multiple of 4×4. For example, a 3×3 convolution can be done with the kernel shown in FIG. 34. It takes the systolic array the same time to perform a 3×3 convolution as it does to perform a 4×4 convolution. That time is governed by the time it takes to read the image data out of the RAM and pass it through the systolic array.

In comparing the foregoing two alternative architectures, we see that in the first version the pixel data are sampled column by column, while in the second version the read operation takes place row by row in the usual raster scan pattern. This second scan pattern is preferable in that the implementation can be carried out with conventional hardware, and therefore the design of the necessary interface is easier.

Of course the second version also eliminates the delay registers in the pixel data path rows since the delays are not necessary. Therefore the invention is not limited to a specific architecture of delay registers or a unique order in which the data are organized. It is clearly evident that there may be other possible arrangements of data and timing hardware that will produce the same results.

Figure 35:
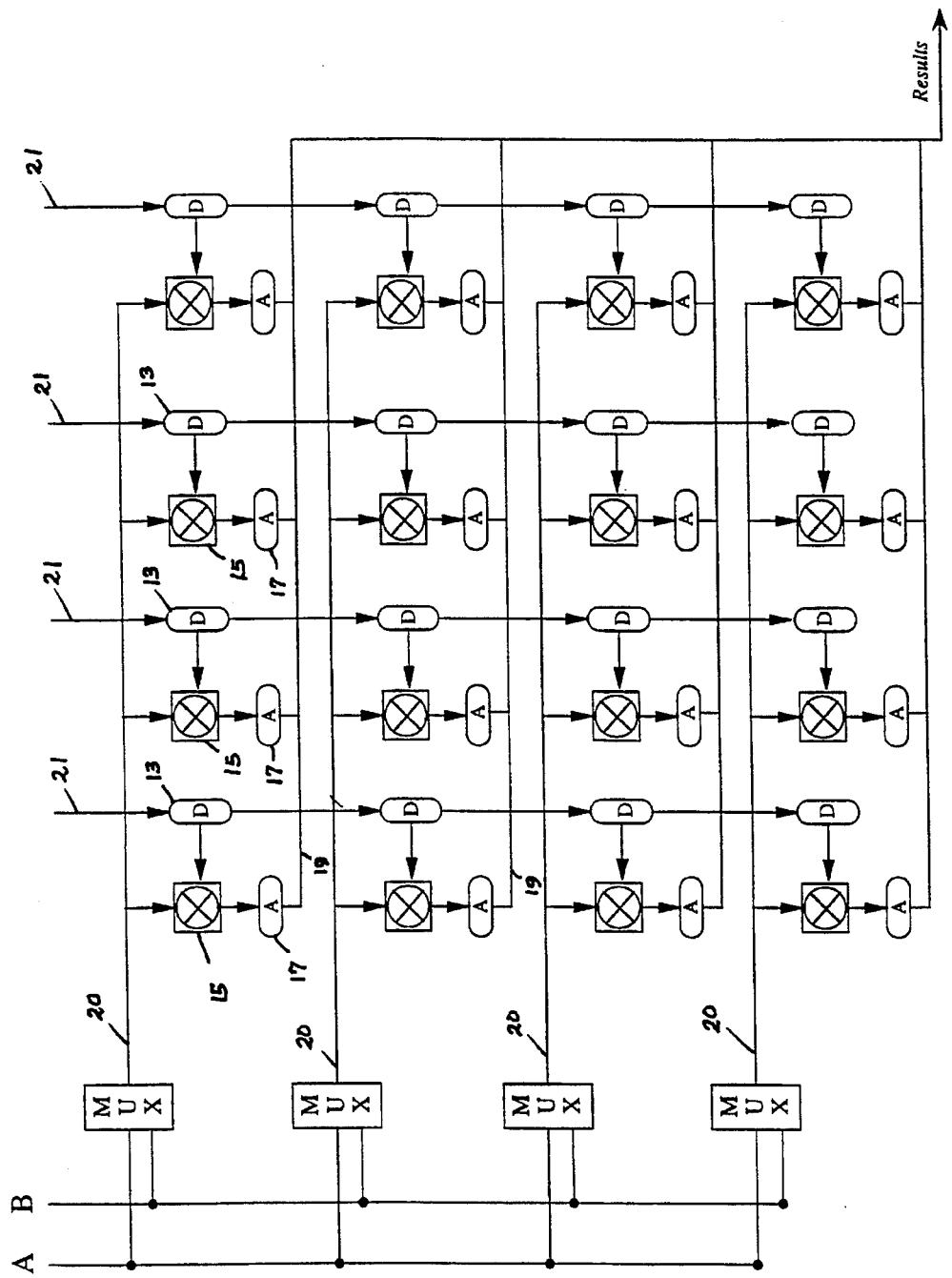
FIG. 35 is a block schematic diagram of a systolic array according to a further alternative embodiment of the present invention.

One common feature of these two embodiments of the invention is the use of multiplexors in the channeling of pixel data to the various processing elements, with each multiplexor programmed to choose data from one or the other of two data sources. A second common feature is the use of two data sources, A and B, that scan the image independently and produce two different streams of data from which the multiplexors select pixels. The foregoing description shows that these features provide the flexibility and programmability that enable the systolic array to handle convolutions of any size. Clearly there are other architectures for the system that would provide these same features. For example, FIG. 35 shows a systolic array architecture having multiplexors that deliver pixel data to each row of the array, with each multiplexor selecting data from either of the data sources A and B. It is clear that this architecture can be programmed to produce the same results as obtained in the previously described versions of the invention.

The foregoing description of embodiments of the invention and their various features and advantages is set forth only for purposes of illustration, and not by way of limitation. It is intended that the scope of the invention be determined only by reference to the following claims.

What is claimed is:

1. A system for performing a convolution of pixel data with kernel data to process an image represented by the pixel data, the system comprising:

a systolic array of processing elements, wherein each of said processing elements comprises:

a pixel data port for receiving an element of the pixel data, a kernel data port for receiving an element of the kernel data, a multiplier coupled to the pixel data port and the kernel data port for multiplying the pixel data element by the kernel data element received by said ports to form a product of said elements, and an accumulator coupled to the multiplier for adding the product to the contents of the accumulator, said systolic array being arranged in a plurality of rows and columns, each row having an equal number of processing elements and each column having an equal number of processing elements, wherein the processing elements pixel data ports in each row are coupled in series such that a pixel data element entered into the input end processing element of the row is transmitted to the other processing element pixel data ports in the row, and wherein the processing element kernel data ports in each column are coupled in series such that a kernel data element entered into the input end processing element of the columns is transmitted to the other processing element kernel data ports in the column;

outputs bus means comprising a plurality of output channels, each of the output channels being coupled to the accumulators of the processing elements in one of the rows and receiving the contents of said accumulators, said plurality being equal in number to the number of rows;

kernel input means comprising:

a plurality of kernel channels, each of the kernel channels being coupled to the kernel data port in the input end processing element of one column and supplying kernel data elements to said input end processing element, said plurality being equal in number to the number of columns, and kernel storage means coupled to the kernel channels for storing the kernel data;

multiplexor means coupled to the pixel data ports in the input end processing elements in each row, and supplying pixel data elements to said input end processing elements;

a first pixel input and a second pixel input coupled to said multiplexor means for supplying pixel data elements to said multiplexor means, said first and second pixel inputs each providing independent data streams of the entire pixel data, such that said multiplexor means selects each pixel data element for each input end processing element from one or the other of said data streams; and clock means coupled to the processing elements of the systolic array, the output bus means, the kernel input means, the multiplexor means, and the first and second pixel inputs for providing timing signals that synchronize the operation of the system by a sequence of clock cycles, wherein said pixel data ports in the input end processing elements of the columns are all coupled to the first pixel input, said input end processing elements being the first row of the systolic array, wherein the multiplexor means comprises a plurality of multiplexors, each of the multiplexors generating one output pixel data element selected from one of two input pixel data elements, the output of each multiplexor being coupled to the pixel data port in the input end processing element of one row of the systolic array other than the first row, one input of the multiplexor being coupled to receive pixel data from another row of the systolic array, and the other input of the multiplexor being coupled to receive pixel data from the second pixel input, and wherein the number of said kernel data elements is the square of some integer L, and wherein each of said multiplexors operates in the sequence of said clock cycles to apply data input to the row corresponding to said multiplexor from said second pixel input each one clock cycle out of L clock cycles, and from the multiplexor output from another row each L-1 clock cycles out of L clock cycles.

2. A system for performing a convolution of pixel data with kernel data to process an image represented by the pixel data, the system comprising:

a systolic array of processing elements, wherein each of said processing elements comprises:

a pixel data port for receiving an element of the pixel data, a kernel data port for receiving an element of the kernel data, a multiplier coupled to the pixel data port and the kernel data port for multiplying the pixel data element by the kernel data element received by said ports to form a product of said elements, and an accumulator coupled to the multiplier for adding the product to the contents of the accumulator, said systolic array being arranged in a plurality of rows and columns, each row having an equal number of processing elements and each column having an equal number of processing elements, wherein the processing elements pixel data ports in each row are coupled in series such that a pixel data element entered into the input end processing element of the row is transmitted to the other processing element pixel data ports in the row, and wherein the processing element kernel data ports in each column are coupled in series such that a kernel data element entered into the input end processing element of the column is transmitted to the other processing element kernel data ports in the columns;

output bus means comprising a plurality of output channels, each of the output channels being coupled to the accumulators of the processing elements in one of the rows and receiving the contents of said accumulators, said plurality being equal in number to the number of rows;

kernel input means comprising:

a plurality of kernel channels, each of the kernel channels being coupled to the kernel data port in the input end processing element of one column and supplying kernel data elements to said input end processing element, said plurality being equal in number to the number of columns, and kernel storage means coupled to the kernel channels for storing the kernel data;

multiplexor means coupled to the pixel data ports in the input end processing elements in each row, and supplying pixel data elements to said input end processing elements;

a first pixel input and a second pixel input coupled to said multiplexor means for supplying pixel data elements to said multiplexor means, said first and second pixel inputs each providing independent data streams of the entire pixel data, such that said multiplexor means selects each pixel data element for each input end processing elements from one or the other of said data streams; and clock means coupled to the processing elements of the systolic array, the output bus means, the kernel input means, the multiplexor means, and the first and second pixel inputs for providing timing signals that synchronize the operation of the system by a sequence of clock cycles, wherein said pixel data ports in the input end processing elements of the columns are all coupled to the first pixel input, said input end processing elements being the first row of the systolic array, wherein the multiplexor means comprises a plurality of multiplexors, each of the multiplexors generating one output pixel data element selected from one of two input pixel data elements, the output of each multiplexor being coupled to the pixel data port in the input end processing element of one row of the systolic array other than the first row, one input of the multiplexor being coupled to receive pixel data from another row of the systolic array, and the other input of the multiplexor being coupled to receive pixel data from the second pixel input, wherein the number of said kernel data elements is the square of some integer L, and wherein each of said multiplexors operates in the sequence of said clock cycles to apply data input to the row corresponding to said multiplexor from said second pixel input each one clock cycle out of L clock cycles, and from the multiplexor output from another row each L-1 clock cycles out of L clock cycles, and wherein said multiplexors, said kernel input means, said first pixel input, and said second pixel input are all programmable to enable the system to compute the convolution for any value of L.

3. A method for performing a two-dimensional image processing convolution of an M×M pixel data array with an L×L kernel data array in an N×N systolic array of processing elements, wherein in each clock cycle of the systolic array each processing element in row i and column j of the systolic array, PE(i,j), receives a pixel data element and a kernel data element, forms the product of the elements and adds the product to the contents of an accumulator, comprising the steps of:

scanning the L×L kernel data array for kernel data values and transmitting these values to the processing elements such that the value received by PE(i,j) is also received by PE(i+1,j) delayed by one clock cycle, and also received by PE(i,j+1) delayed by L+1 clock cycles;

scanning the M×M pixel data array for pixel data values and transmitting these values to the processing elements such that the value received by PE(i,j) is also received by PE(i,j+1) delayed by one clock cycle;

scanning the M×M pixel data array to form a first pixel data stream A and a second pixel data stream B, wherein each stream contains an entire scan of the pixel data array;

transmitting data stream A to the first row of processing elements PE(i,j);

transmitting pixel data from pixel data streams A and B to the remaining rows of processing elements such that during each sequence of L clock cycles the pixel data values received by PE(i+1,j) are the same as the values received by PE(i,j) for L-1 of said cycles, and for the remaining 1 cycle the pixel data value received by PE(i+1,j) is obtained from said second data stream B; and after each scan of the pixel data array and kernel data array, repeating each such scan until the entire convolution has been computed.

4. The method according to claim 3, wherein said first and second data streams are such formed by scanning successively each block of L rows and M columns of said M×M pixel data array, and wherein in each of said blocks the streams are formed by scanning successively each column of L rows of said pixel data array values.

5. The method according to claim 4, wherein during the period that said first data stream is formed by scanning a block of L rows and M columns of pixel data, said second data stream B is formed by scanning another of said blocks of L rows and M columns, delayed by L clock cycles relative to the stream A scan.

6. The method according to claim 3, wherein the L×L kernel data array is scanned by scanning successively each column of kernel data values.

7. The method according to claim 3, wherein at the outset of each clock cycle, the kernel data value in each processing element PE(i,j) having i less than N is transmitted to the processing element PE(i+1,j).

8. The method according to claim 3, wherein at the outset of each clock cycle, the pixel data value in each processing element PE(i,j) having j less than N is transmitted to the processing element PE(i,j+1).

9. The method according to claim 3, further comprising the step of, at the beginning of each successive scan of the L×L kernel data array by each processing element in row i, PE(i,j):

transferring the contents of the accumulator of PE(i,j) to an output bus; and resetting said accumulator to zero.

10. A method for performing a two-dimensional image processing convolution of an M×M pixel data array with an L×L kernel data array in an N×N systolic array of processing elements, wherein in each clock cycle of the systolic array each processing element in row i and column j of the systolic array, PE(i,j), receives a pixel data element and a kernel data element, forms the product of the elements and adds the product to the contents of an accumulator, comprising the steps of:

scanning the L×L kernel data array for kernel data values and transmitting these values to the processing elements such that the value received by PE(i,j) is also received by PE(i+1,j) delayed by one clock cycle, and also received by PE(i,j+1) delayed by L+1 clock cycles;

scanning the M×M pixel data array for pixel data values and transmitting these values to the processing elements such that the value received by PE(i,j) is also received by PE(i,j+1) simultaneously;

scanning the M×M pixel data array to form a first pixel data stream A and a second pixel data stream B, wherein each stream contains an entire scan of the pixel data array;

transmitting data stream A to the first row of processing elements PE(i,j);

transmitting pixel data from pixel data streams A and B to the remaining rows of processing elements such that during each sequence of L clock cycles the pixel data values received by PE(i+1, j) are the same as the values received by PE(i,j) for L-1 of said cycles, and for the remaining 1 cycle the pixel data value received by PE(i+1,j) is obtained from said second data stream B; and after each scan of the pixel data array and kernel data array, repeating each such scan until the entire convolution has been computed.

11. The method according to claim 10, wherein said first and second data systems are each formed by scanning successively each block of L columns and M rows of said M×M pixel data array, and wherein in each of said blocks the streams are formed by scanning successively each row of L columns of said pixel data array values.

12. The method according to claim 11, wherein during the period that said first data stream is formed by scanning a block of L columns and M rows of pixel data, said second data stream B is formed by scanning another of said blocks of L columns and M rows, delayed by L clock cycles relative to the stream A scan.

13. The method according to claim 10, wherein the L×L kernel data array is scanned by scanning successively each row of kernel data values.

14. The method according to claim 10, wherein at the outset of each clock cycle, the kernel data value in each processing element PE(i,j) having i less than N is transmitted to the processing element PE(i+1,j).

15. The method according to claim 10, further comprising the step of, at the beginning of each successive scan of the L×L kernel data array by each processing element in row i, PE(i,j):

transferring the contents of the accumulator of PE(i,j) to an output bus; and resetting said accumulator to zero.

* * * * *